United States Patent
Kempshall

(10) Patent No.: US 10,287,000 B2
(45) Date of Patent: *May 14, 2019

(54) HYBRID LIGHTER-THAN-AIR VEHICLE

(71) Applicant: Scott R. Kempshall, St. Petersburg, FL (US)

(72) Inventor: Scott R. Kempshall, St. Petersburg, FL (US)

(73) Assignee: Hyalta Aeronautics, Inc., Largo, FL (US)

( * ) Notice: Subject to any disclaimer, the term of this patent is extended or adjusted under 35 U.S.C. 154(b) by 639 days.

This patent is subject to a terminal disclaimer.

(21) Appl. No.: 14/746,332

(22) Filed: Jun. 22, 2015

(65) Prior Publication Data

US 2016/0023747 A1    Jan. 28, 2016

Related U.S. Application Data

(63) Continuation-in-part of application No. 14/515,079, filed on Oct. 15, 2014, which is a continuation-in-part
(Continued)

(51) Int. Cl.
*B64C 3/44* (2006.01)
*B64C 3/38* (2006.01)
(Continued)

(52) U.S. Cl.
CPC .................. *B64C 3/38* (2013.01); *B64B 1/00* (2013.01); *B64C 3/46* (2013.01); *B64D 27/02* (2013.01);
(Continued)

(58) Field of Classification Search
CPC .... B64C 3/38; B64C 3/46; B64B 1/00; B64B 2201/00; B64D 27/02; B64D 2211/00
(Continued)

(56) References Cited

U.S. PATENT DOCUMENTS 3,661,290 A * 5/1972 Davenport ................ B64B 1/00
220/6
3,907,218 A   9/1975 Miller
(Continued)

FOREIGN PATENT DOCUMENTS

WO    WO-0032469 A1 * 6/2000  ............... B64B 1/06

OTHER PUBLICATIONS

International Search Report for PCT Application No. PCT/US15/41490, International filing date Jul. 22, 2015, and dated Oct. 16, 2015.

*Primary Examiner* — Joshua J Michener
*Assistant Examiner* — George Andonyan
(74) *Attorney, Agent, or Firm* — Nicholas Pfeifer; Smith & Hopen, P.A.

(57) ABSTRACT

The present invention is a variable geometry aircraft that is capable of morphing its shape from a symmetric cross-section buoyant craft to an asymmetric lifting body and even to a symmetric zero lift configuration. The aircraft may include variable span, length, and camber. The variability of the structure and the flexible envelope allows the aircraft to adjust its aspect ratio along with the camber of the upper and/or lower surfaces to achieve varying shapes. This transformation changes both the lift and drag characteristics of the craft and may be accomplished while the craft is airborne.

20 Claims, 28 Drawing Sheets

Related U.S. Application Data of application No. 14/341,184, filed on Jul. 25, 2014, now Pat. No. 9,623,954.

(51) Int. Cl.
*B64B 1/00* (2006.01)
*B64C 3/46* (2006.01)
*B64D 27/02* (2006.01)

(52) U.S. Cl.
CPC ....... *B64B 2201/00* (2013.01); *B64D 2211/00* (2013.01)

(58) Field of Classification Search
USPC .......................................................... 244/5
See application file for complete search history.

(56) References Cited

U.S. PATENT DOCUMENTS

| | | | |
|---|---|---|---|
| 3,913,871 A | 10/1975 | Miller | |
| 3,970,270 A | 7/1976 | Pittet, Jr. | |
| 3,976,265 A | 8/1976 | Doolittle | |
| 3,993,268 A | 11/1976 | Moore | |
| 4,052,025 A | 10/1977 | Clark et al. | |
| 4,085,912 A | 4/1978 | Slater | |
| 4,102,519 A | 7/1978 | Crosby, Jr. | |
| 4,261,534 A | 4/1981 | Roselli | |
| 4,269,375 A * | 5/1981 | Hickey | B64B 1/08 244/12.2 |
| 4,366,936 A | 1/1983 | Ferguson | |
| 4,415,131 A | 11/1983 | Bertelsen et al. | |
| 4,482,110 A | 11/1984 | Crimmins, Jr. | |
| 4,497,272 A | 2/1985 | Veazey | |
| 4,533,099 A * | 8/1985 | Stewart | A63H 27/085 244/153 R |
| 4,695,012 A | 9/1987 | Lindenbaum | |
| 4,779,825 A | 10/1988 | Sams | |
| 5,005,783 A | 4/1991 | Taylor | |
| 5,474,257 A | 12/1995 | Fisher et al. | |
| 5,823,468 A * | 10/1998 | Bothe | B64B 1/08 244/12.3 |
| 6,241,195 B1 | 6/2001 | Wagner, III | |
| 6,892,981 B2 * | 5/2005 | Lipeles | B64C 3/30 244/13 |
| 6,910,661 B2 | 6/2005 | Dockter et al. | |
| 7,261,255 B2 * | 8/2007 | Li | B64B 1/04 244/125 |
| 8,931,739 B1 * | 1/2015 | Lutke | B64C 1/34 244/119 |
| 2004/0021037 A1 * | 2/2004 | Nachbar | B64B 1/02 244/125 |
| 2004/0084565 A1 * | 5/2004 | Albrecht | B64B 1/20 244/5 |
| 2006/0284005 A1 * | 12/2006 | Ifju | A63H 27/007 244/49 |
| 2009/0314880 A1 * | 12/2009 | Rawdon | B64B 1/06 244/30 |
| 2010/0025538 A1 * | 2/2010 | Hamilton | B64C 3/38 244/219 |
| 2011/0267241 A1 | 11/2011 | Grimm et al. | |
| 2011/0315811 A1 * | 12/2011 | Al-Garni | A45B 23/00 244/30 |
| 2012/0248241 A1 * | 10/2012 | Goelet | B64B 1/06 244/30 |
| 2014/0054421 A1 * | 2/2014 | Bernard | B64B 1/04 244/128 |
| 2016/0023747 A1 * | 1/2016 | Kempshall | B64B 1/00 244/46 |
| 2016/0288900 A1 * | 10/2016 | Kempshall | B64B 1/00 |

* cited by examiner

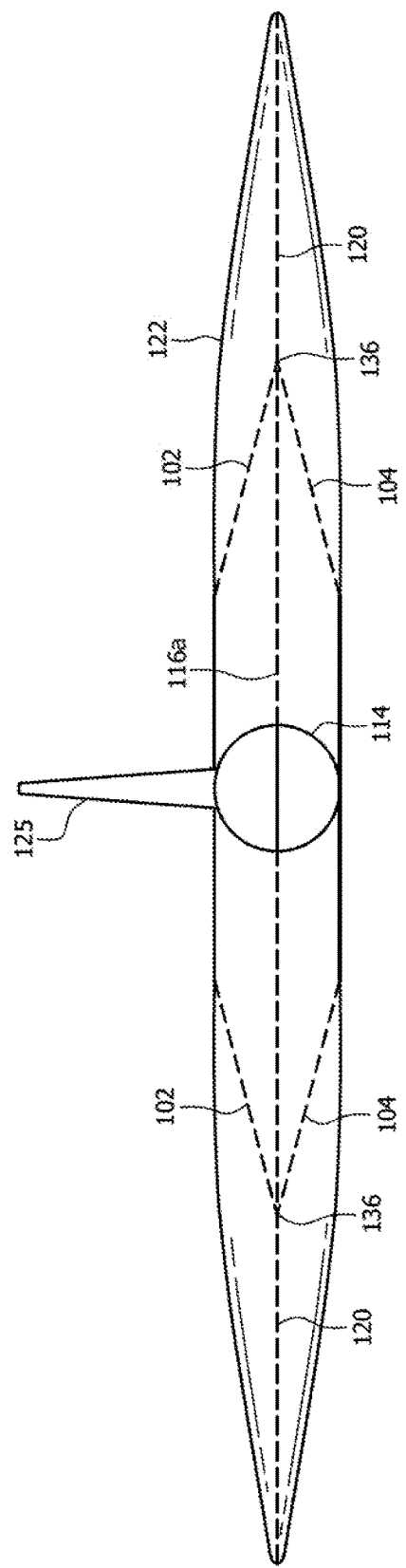

FoilSim Output for Symmetric Foil with Low Thickness as a Percentage of Chord

FoilSim III    Units: Metric    Reset

Input    Student Version 1.5a    Output

| Flight | Shape | Probe | Gages |
| Size | Analysis | Geometry | Data |

Select Plot

Cl 0.0    Reynolds # 5705460

Cd 0.011    L/D ratio 0.0

Joukowski Airfoil
Camber = 0.0 % chord, Thickness = 9.987 % chord,
Chord = 1.005 m, Span = 1.005 m,
Surface Area = 1.011 sq m,
Angle of attack = 0.0 degrees,
Standard Earth Atmosphere
Altitude = 3048 m, Density = 0.904kg/cu m
Pressure = 69.68kPa, Temperature = -4C,
Airspeed = 370 km/hr,
Lift Coefficient = 0.0
Drag Coefficient = 0.011

View Display: Edge Streamlines Top Side-3D Find
Moving Frozen Geometry

Zoom

Airfoil Shape: Airfoil

Angle-deg 0.0

Camber-%c 0.0

Thick-%crd 9.987

Basic Shapes: Symmetric   High Camber   Flat Plate

Flat Bottom   Neg. Camber   Ellipse   Curve Plate

FoilSim Output for Asymmetric Foil with Low Thickness as a Percentage of Chord

FoilSim III    Units: Metric    Reset

Input    Student Version 1.5a    Output

Flight    Shape    Probe    Gages

Size    Analysis    Geometry    Data

Select Plot    Plot

Cl  0.332    Reynolds # 5705460

Cd  0.056    L/D ratio  5.844

Joukowski Airfoil
Camber = 0.0 % chord , Thickness = 9.987 % chord ,
Chord = 1.005 m , Span = 1.005 m ,
Surface Area = 1.011 sq m ,
Angle of attack = 0.0 degrees ,
Standard Earth Atmosphere
Altitude = 3048 m , Density = 0.904kg/cu m
Pressure = 69.68kPa, Temperature = -4C,
Airspeed = 370 km/hr ,
Lift Coefficient = 0.0
Drag Coefficient = 0.011

View    Edge    Top    Side-3D    Find
Display    Streamlines    Moving    Frozen    Geometry Zoom Airfoil Shape    Airfoil Angle-deg    0.0

Camber-%c    3.0

Thick-%crd    12.419

Basic Shapes:    Symmetric    High Camber    Flat Plate

Flat Bottom    Neg. Camber    Ellipse    Curve Plate

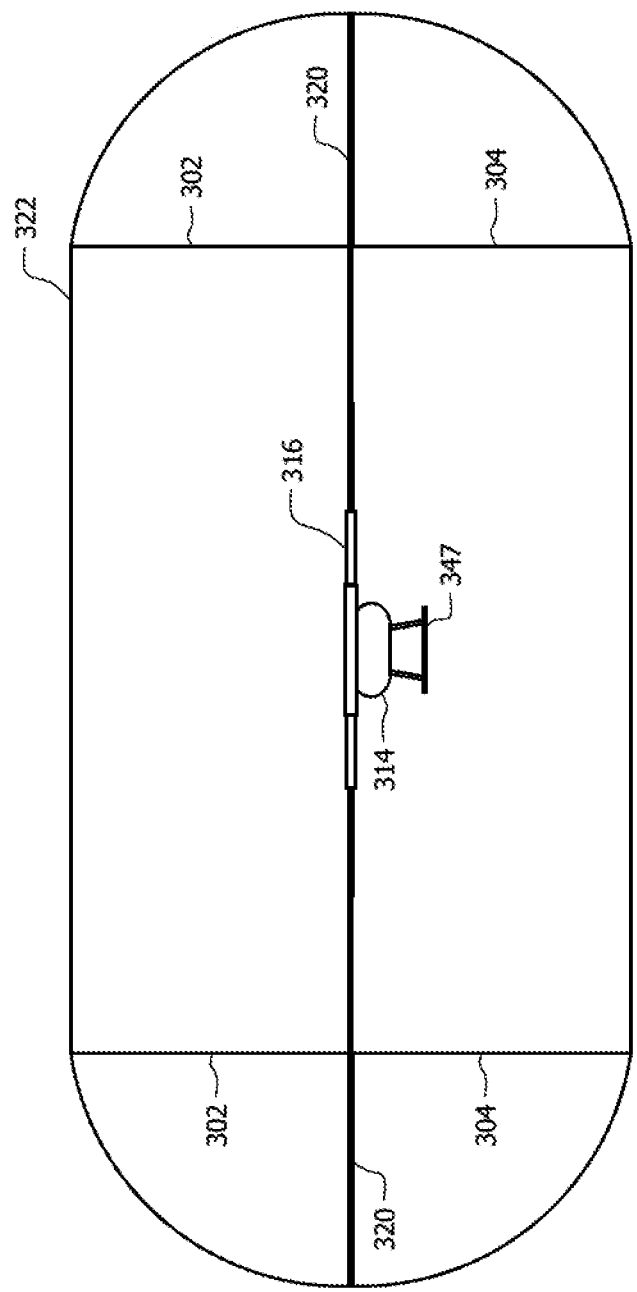

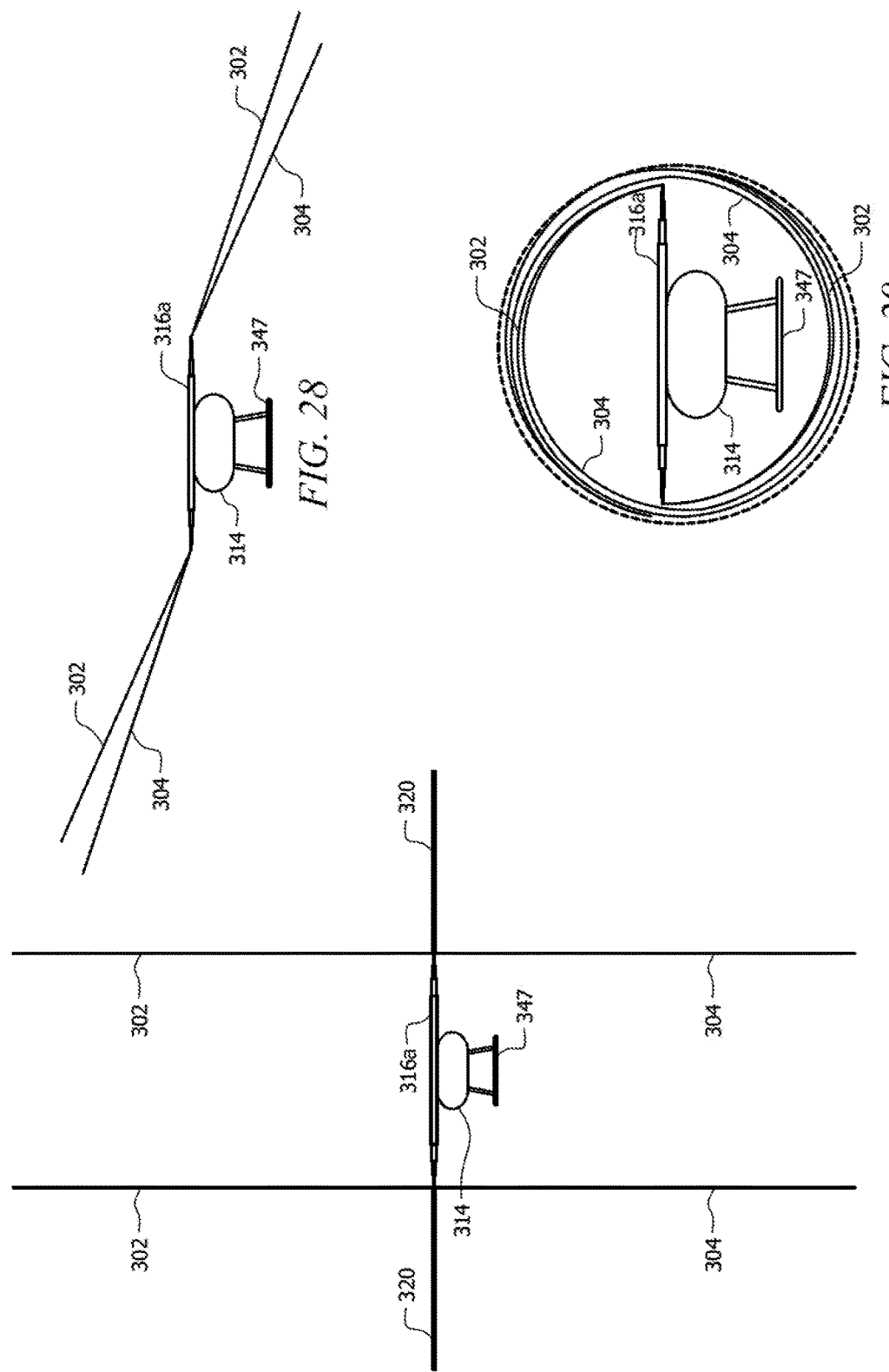

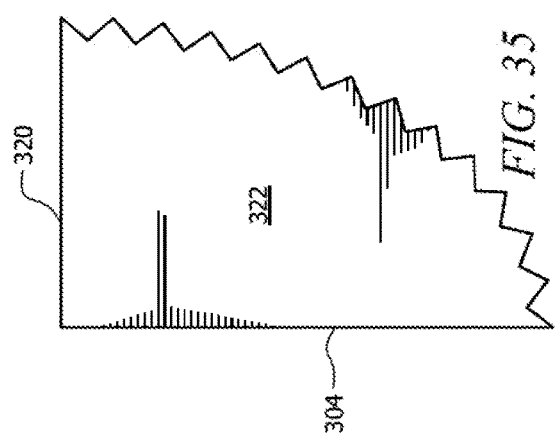
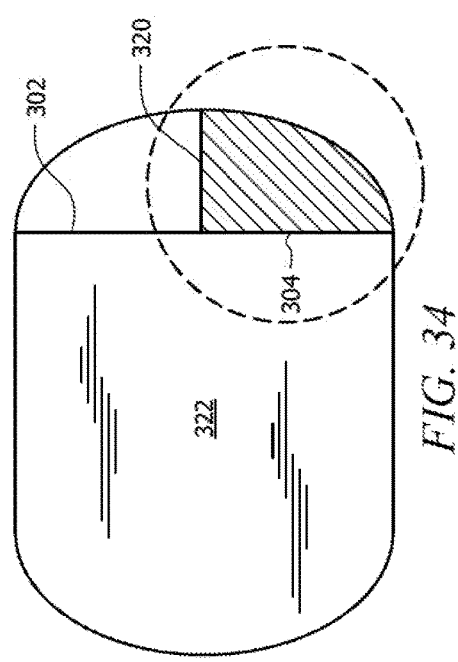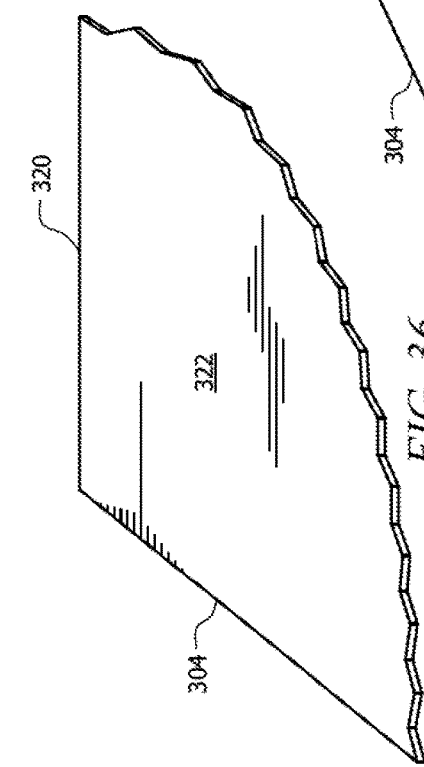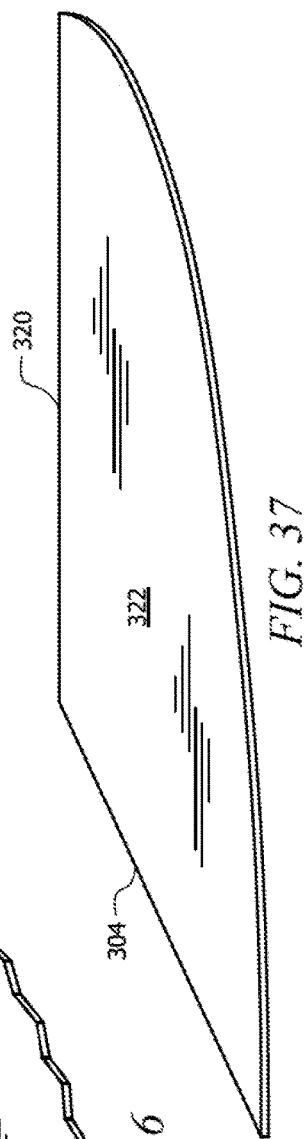

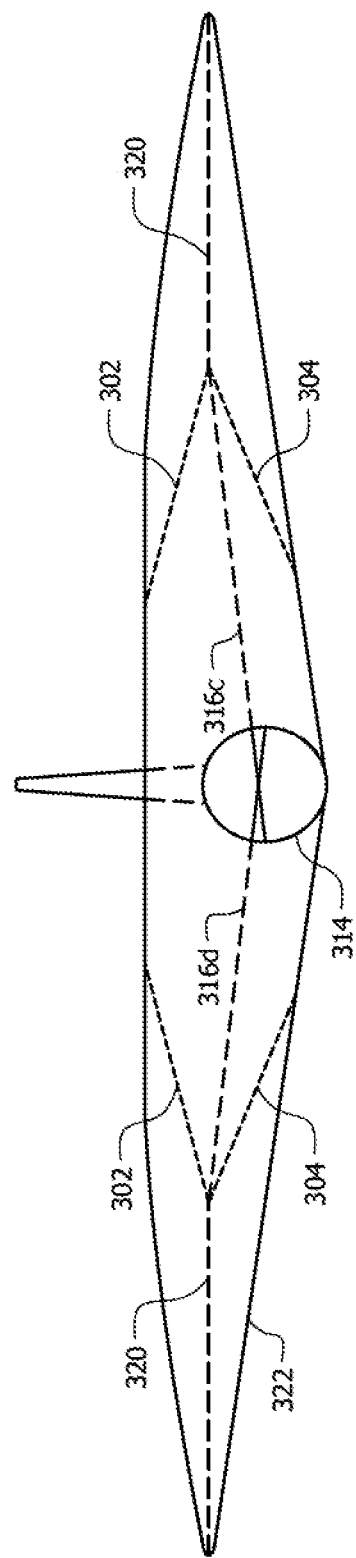

HYBRID LIGHTER-THAN-AIR VEHICLE

CROSS-REFERENCE TO RELATED APPLICATIONS

This nonprovisional application is a continuation in part of and claims priority to nonprovisional application Ser. No. 14/515,079, entitled "HYBRID LIGHTER-THAN-AIR VEHICLE," filed Oct. 15, 2014 by the same inventor, which is a continuation in part of and claims priority to nonprovisional application Ser. No. 14/341,184, entitled "HYBRID LIGHTER-THAN-AIR VEHICLE," filed Jul. 25, 2014 by the same inventor.

BACKGROUND OF THE INVENTION

1. Field of the Invention

This invention relates, generally, to aircrafts. More specifically, it relates to aircrafts convertible between lighter-than-air and heavy-than-air configurations.

2. Brief Description of the Prior Art

Lighter-Than-Air (LTA) aircrafts have some characteristics not shared with Heavier-Than-Air (HTA) aircrafts in that they can maintain altitude without moving in a medium and can do so as long as buoyancy is maintained. LTA aircrafts use low-density gas, such as helium or hydrogen to float in higher density air. These aircrafts usually employ one or more gasbags filled with low-density gas to create a buoyancy force that offsets the weight of the aircraft. The downside of LTA aircrafts is their large size, which is accompanied by large drag characteristics, preventing them from traveling at higher speeds. The current speed record for an LTA aircraft is 112 Km/hr (69.6 mph).

HTA aircrafts use Newton's third law and Bernoulli's principle to achieve flight. These aircrafts are generally fixed wing or rotor wing aircraft. In either case, part or parts of the structure (e.g., wing, rotors, propellers, fuselage, and control surfaces) have a characteristic shape called an airfoil. Airfoils are generally asymmetric in cross-section with the upper surface having a greater length than the lower surface. This causes air moving across the upper surface to travel faster than the air traveling across the lower surface causing a pressure decrease on the upper surface resulting in lift.

Lift can also be achieved/altered by altering the angle of attack (AoA) of an airfoil relative to the oncoming airflow. Increased AoA causes mass deflection resulting in lift (Newton's third law). Generally, increasing AoA increases lift until the angle reaches a point at which the airflow separates from the surface of the airfoil causing aerodynamic stall.

Regardless of means for creating lift, an HTA requires a wing-like structure moving through a fluid. Movement requires a power source and no power source can last indefinitely. Therefore, the HTA aircrafts can only maintain flight for limited periods of time. Even powerless gliders have duration limits as they trade airspeed for altitude gained from thermal lift. The limitation in flight time of an HTA aircraft, however, is compensated by low drag characteristics and thus, high-speed flight.

The clear tradeoff between LTA and HTA aircrafts is speed verse indefinite flight. An ideal aircraft would have the ability of an LTA to hover, or station-keep, for extended periods for observation or surveillance roles and also the ability of an HTA to operate at high speeds. This can theoretically be achieved through an aircraft convertible between an LTA and an HTA configuration. Currently, there exist hybrid convertible aircrafts, but none that provide a unique combination of attributes of both a fixed wing aircraft and a LTA craft allowing for indefinite mission durations, low energy station keeping, and the ability to dash at relatively high velocities.

U.S. Pat. No. 5,005,783 to James D. Taylor teaches a variable geometry airship capable of converting between a LTA and HTA airship. However, the airship is operationally complex and does not extend the operating range sufficiently to be practical as shown in Table 1. Along with multiple other pitfalls, the shape and design of this airship prevents the airship from transforming into both a symmetric neutral lift configuration and a negative lift configuration, thereby reducing the effectiveness of the airship.

U.S. Pat. No. 4,102,519 to Edward L. Crosby, Jr. teaches a variable lift inflatable airfoil. However, this invention lacks internal moveable structures, which prevent the airfoil from achieving multiple configurations. Additionally, the airfoil lacks a propulsion system and/or control surfaces.

Accordingly, what is needed is an improved variable geometry aircraft having a simple, moveable internal structure to easily convert the aircraft between an LTA configuration and an HTA configuration. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved variable geometry aircraft having simple, moveable internal structure to easily convert the aircraft between a lighter-than-air configuration and a heavier-than-air configuration is now met by a new, useful, and nonobvious invention.

The novel structure includes a convertible design having a lighter-than-air configuration and a heavier-than-air configuration with a flexible envelope in communication with a base structure. The flexible envelope has a leading edge and a trailing edge creating a chord line. The aircraft also has a span extending from a port side wingtip to a starboard side wingtip. The lighter-than-air configuration has a span that is less than the span of the aircraft when in the heavier-than-air configuration.

The base structure includes a central core, a port side outrigger, and a starboard side outrigger. In an embodiment, the core has an adjustable chord length directionally parallel with the longitudinal axis of the aircraft, such that the core is capable of adjusting at least some portion of the chord length of the flexible envelope. In a certain embodiment, the port side outrigger and the starboard side outrigger each has an adjustable chord length, such that at least some portion of the chord length of the flexible envelope adjusts as each outrigger's chord length adjusts. The lighter-than-air configuration is achieved in any geometry in which the volume of buoyant gas is sufficient to offset the weight of the aircraft and payload.

In an embodiment, the novel structure further includes moveable longerons, and length adjusting envelope expansion arms (also referred to as "slack managers") for varying the span of the aircraft. In a certain embodiment, the aircraft may include a propulsion system.

In addition to the central core running along a central longitudinal axis of the aircraft, the base structure includes a leading edge strut extending in a direction perpendicular to and in communication with the central core, a trailing edge strut extending in a direction perpendicular to and in communication with the central core. The port side outrigger extends in a direction parallel to the central core and is in communication with the struts, and the starboard side outrigger extends in a direction parallel to the central core and in communication with the struts. Additionally, the base structure is in communication with the moveable longerons and the envelope expansion arms. The central core may house the propulsion system to provide a powered aircraft or may house the mechanisms and/or lighter-than-air gas container(s), which would be more ideal for a glider embodiment.

The moveable longerons include upper and lower longerons. The upper longerons are in communication with the flexible envelope and an upper translation assembly. In an embodiment, the upper translation assembly has an extended configuration where the moveable longerons are in a high camber orientation and a retracted configuration where the upper moveable longerons are in a low camber orientation. In transitioning to the retracted configuration, the upper translation assembly pulls the upper moveable longerons inward towards the central longitudinal axis of the aircraft to decrease aircraft thickness. In transitioning to the extended configuration, the upper translation assembly pushes (or pulls in the case of the strap type translation assembly) the moveable longerons outward away from the central longitudinal axis of the aircraft to place the upper moveable longerons in a more vertical orientation, which increases the aircraft thickness, compared to longeron's orientation in the retracted configuration.

Similarly, the lower longerons are in communication with the flexible envelope and a lower translation assembly. The lower translation assembly has an extended configuration where the moveable longerons are in a high camber orientation and a retracted configuration where the lower moveable longerons are in a low camber orientation. In transitioning to the retracted configuration, the lower translation assembly pulls the lower moveable longerons inward towards a central longitudinal axis of the aircraft to decrease aircraft thickness. In transitioning to the extended configuration, the lower translation assembly pushes (or pulls in the case of the strap type translation assembly) the moveable longerons outward away from the central longitudinal axis of the aircraft to place the lower moveable longerons in a more vertical orientation, which increases the aircraft's thickness, compared to the orientation of the longerons in the retracted configuration. A certain embodiment may include an upper translation assembly without a lower translation assembly or a lower translation assembly without an upper translation assembly.

In a certain embodiment, each translation assembly includes a translation motor fixed to the base structure of the aircraft and a translation strap in communication with the translation motor. The translation strap is a continuous loop fixed at one of the longerons and passes near an outrigger on the same side of the aircraft. When operated the motor causes the translation strap to rotate, which in turn pulls the longeron towards or away from a central longitudinal axis of the aircraft.

The upper and lower moveable longerons each include a port side longeron and a starboard side longeron, wherein each longeron has a generally airfoil or arc shape and a predetermined length that extends in generally the same direction as the central longitudinal axis of the aircraft. Moreover, the moveable longerons are in a generally vertical orientation when in the high camber position and in an acute angle orientation when in the low camber position.

The length-adjusting envelope expansion arms comprise of a port side envelope expansion arm and a starboard side envelope expansion arm. Each arm has a generally arc shape, is subjected to a bias force attempting to force each arm in a direction away from the central longitudinal axis of the aircraft resulting in an increased arc shape, and is in communication with the flexible envelope. Additionally, each envelope expansion arm has a retracted position and an expanded position, where in the retracted position, the length and arc of the envelope expansion arm is at a minimum and in the expanded position, the length and arc of the envelope expansion arm is at a maximum. The retracted position is achieved when a tension force in the flexible envelope overcomes the bias force, resulting from the transition of the moveable longerons towards a more vertical orientation, thereby reducing the length and arc of the envelope expansion arm. Contrastingly, the expanded position is achieved when the tension force in the flexible envelope is overcome by the bias force, resulting from the transition of the moveable longerons to a more horizontal orientation, thereby increasing the length and arc of the envelope expansion arm. Due to the positioning of the envelope expansion arms, the span of the aircraft is directly affected by the transition between the retracted position and the extended position.

In a certain embodiment, the envelope expansion arm is an anisotropic beam having two or more composite rods with cross members extending between the rods. The cross members are designed to have a predetermined spring constant embedded into the structure. One of the composite rods is pivotally attached to the aircraft and one or more of the composite rods are anchored against the pivot structure to provide a source of the tension.

The novel structure further includes a structural connection point to connect the base structure with the moveable longerons and the envelope expansion arms. The structural connection point has a first fixed connection attached to an outrigger, a second fixed connection attached to a strut, a first pivoting connection attached to one of the upper moveable longeron, a second pivoting connection attached to one of the lower moveable longeron, and a third pivoting connection attached to one of the envelope expansion arms.

In an embodiment, the aircraft uses a gas storage and retrieval system adapted to house, distribute, and retrieve lighter-than-air gas. This system allows the aircraft to easily convert between a lighter-than-air configuration and a heavier-than-air configuration multiple times without having to refill on gas.

In an embodiment, the aircraft includes a propulsion system that includes an electrical generator system adapted to convert wind energy into electrical energy while the aircraft is in the lighter-than-air configuration. In a certain embodiment, flexible solar panels are attached to an exterior surface of the envelope to retrieve and convert solar energy into electrical energy to extend mission time.

In an embodiment, the aircraft has a payload hard point attached to the lower translation assembly to facilitate the attachment and management of external payloads in addition to payloads attached internally to the core structure. In an embodiment, the aircraft includes additional structural features, referred to as a wing load management system, to improve the wing loading capabilities that might be necessary when transporting heavy payloads. The wing load management system may include strap spars and support ribs for load distribution. A certain embodiment includes a payload hard point attached to the core of the aircraft and the envelope attached to the sides of the payload hard point such that some portion of the payload hard point is external to the envelope.

A certain embodiment may include at least some portion of the flexible envelope having an accordion-like structure. In a certain embodiment, the leading edge strut may be out of plane with the chord line.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 5C is a front view of the present invention in the dash configuration.

6 is a captured output for a symmetric airfoil with high thickness as a percentage of chord that was achieved using FoilSim software.

FIG. 7 is a captured output for a symmetric airfoil with low thickness as a percentage of chord that was achieved using FoilSim software.

FIG. 8 is a captured output for an asymmetric airfoil with low thickness as a percentage of chord that was achieved using FoilSim software.

Figure 9:
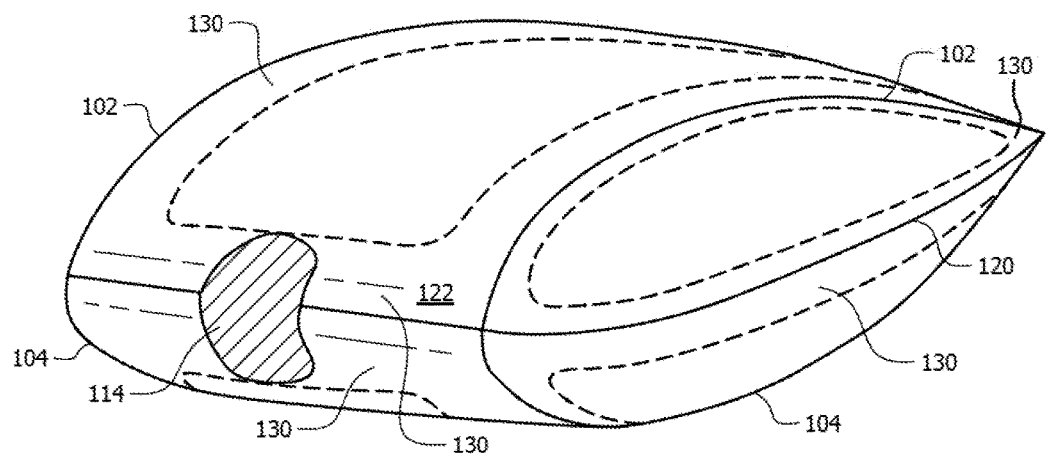

FIG. 9 is a perspective view of a certain embodiment of the present invention illustrating the location of reinforcement layers.

Figure 10:
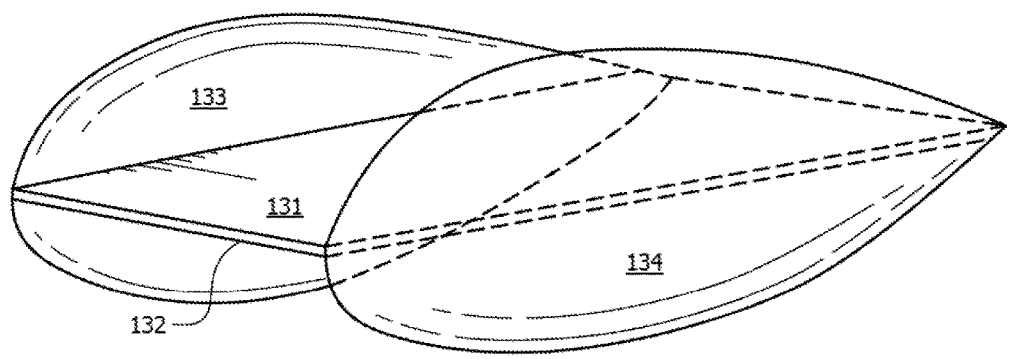

FIG. 10 is a perspective view of a certain embodiment showing the configuration of internal panels used to create compartmentalized gas bladders.

Figure 11:
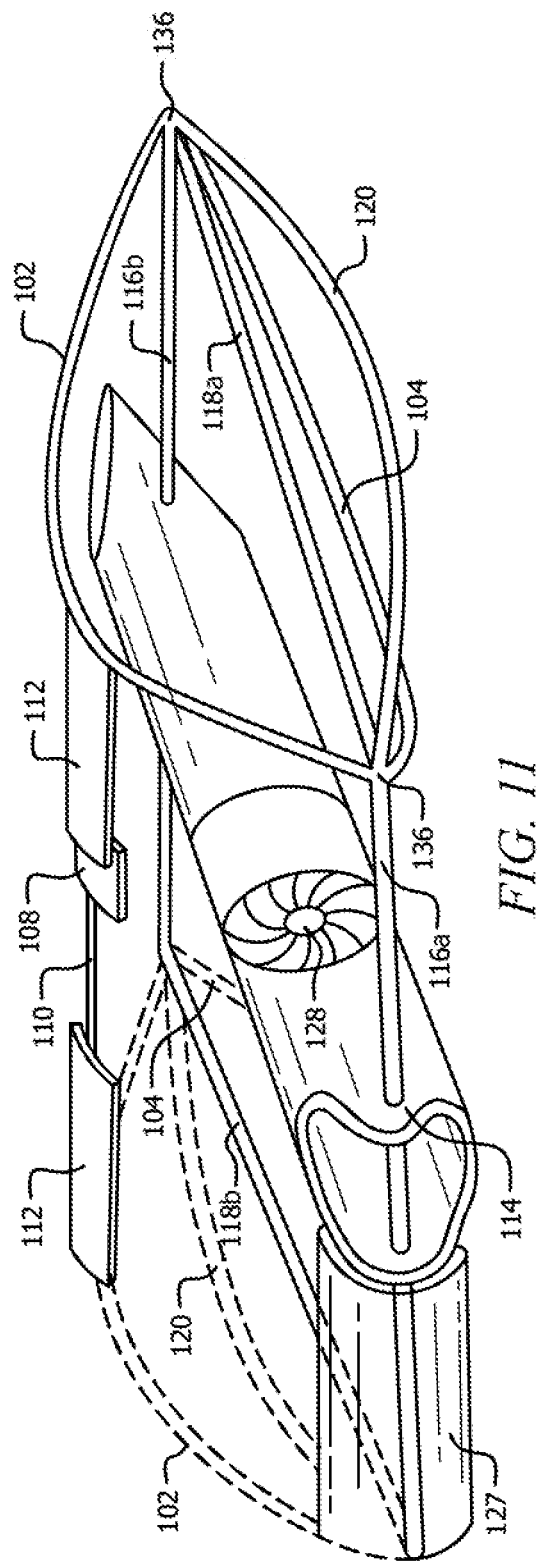

FIG. 11 is a perspective view of a certain embodiment of the present invention showing the internal structural components of the aircraft.

Figure 12:
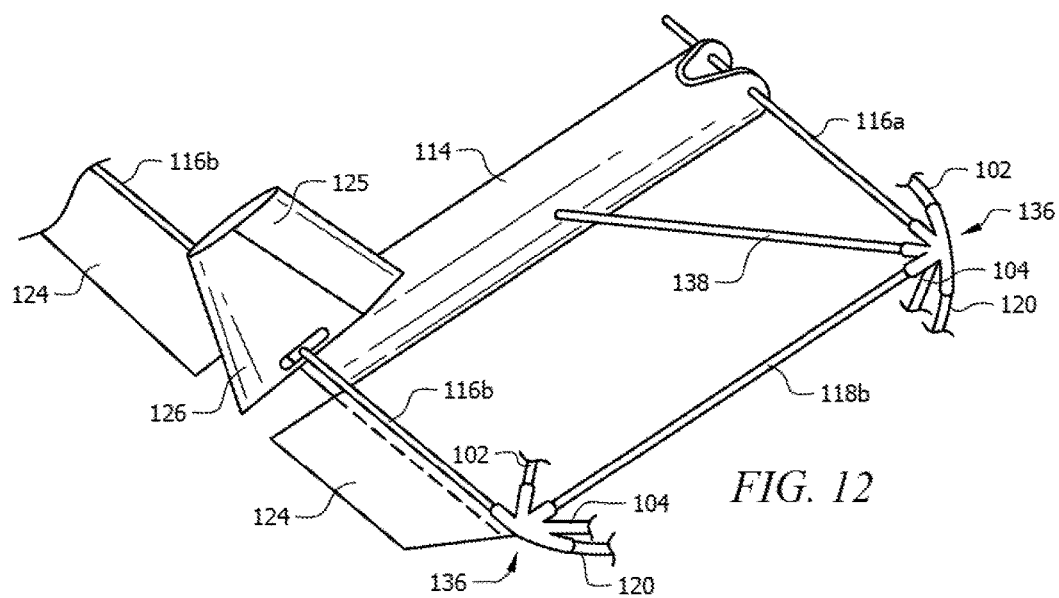

FIG. 12 is a rear perspective view of the starboard side of a certain embodiment of the present invention showing the internal structural components of the aircraft.

Figure 13A:
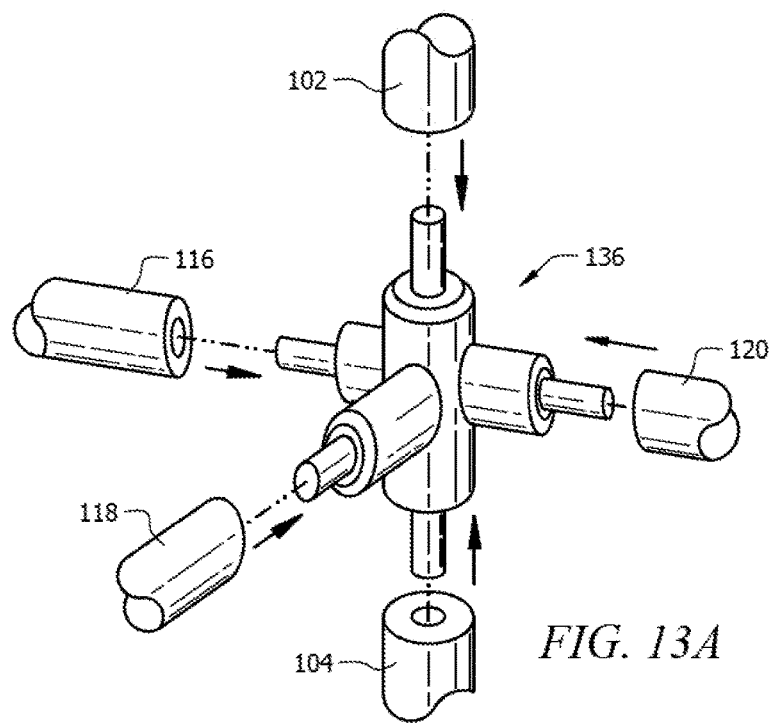

FIG. 13A is an exploded view of a certain embodiment of a structural connection point.

Figure 13B:
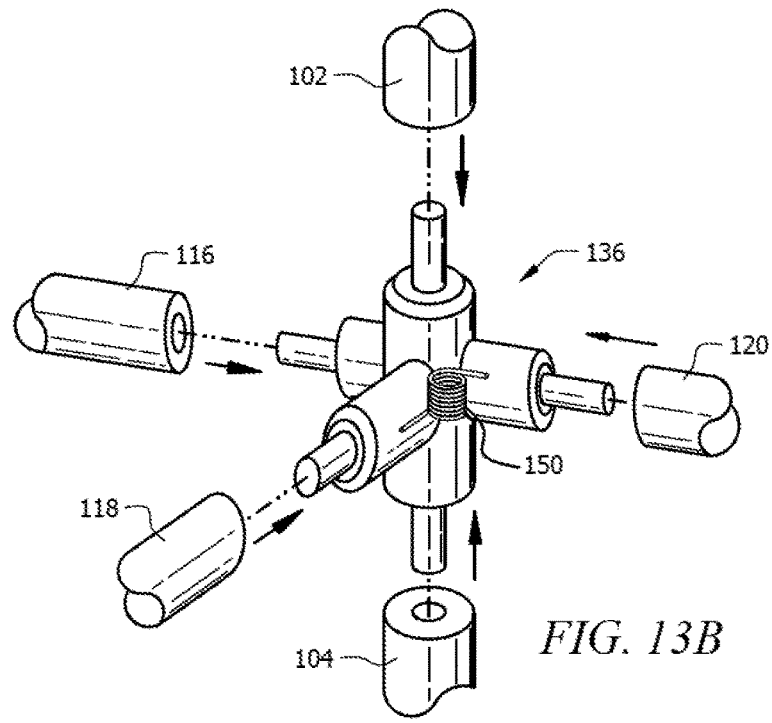

FIG. 13B is an exploded view of an embodiment of a structural connection point.

Figure 14A:
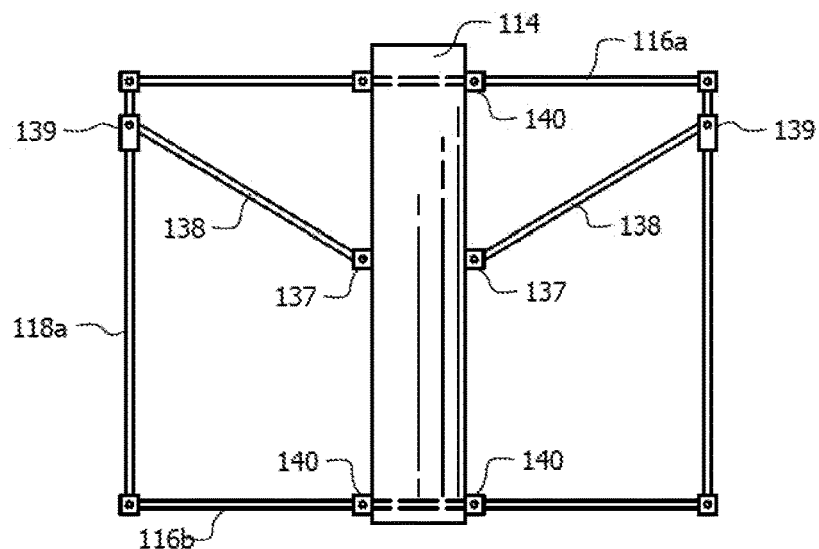

FIG. 14A is a top view of the internal base structure of a certain embodiment of the present invention.

Figure 14B:
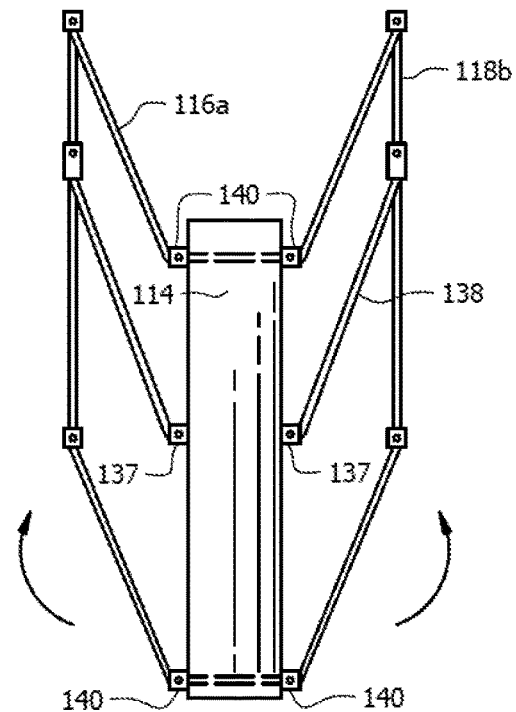

FIG. 14B is a top view of the internal base structure of a certain embodiment of the present invention shown in a folded configuration.

Figure 15:
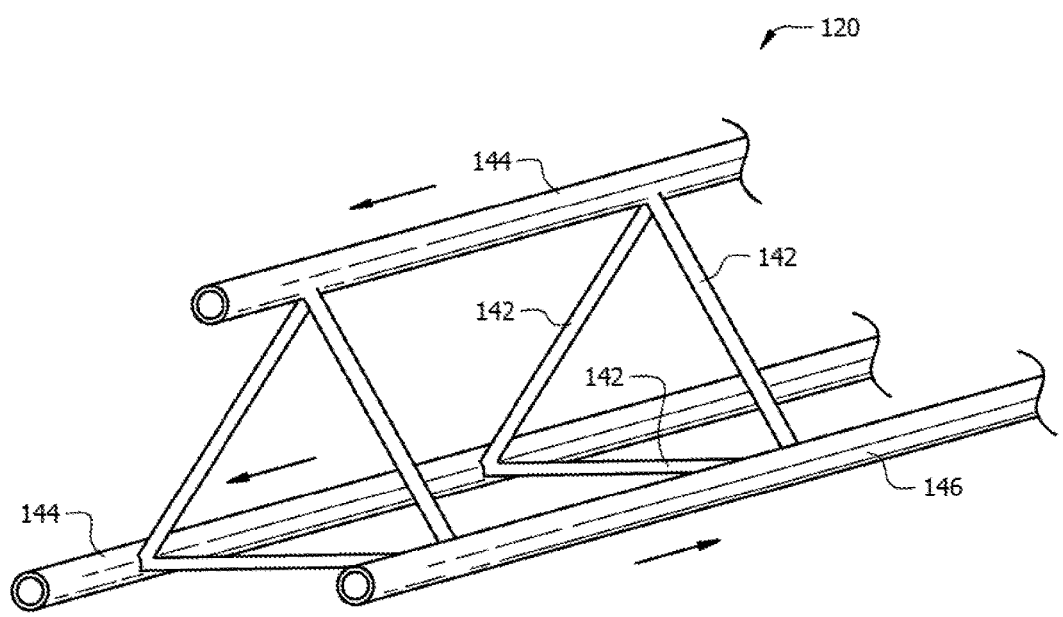

FIG. 15 is a certain embodiment of the envelope expansion arm.

Figure 16:
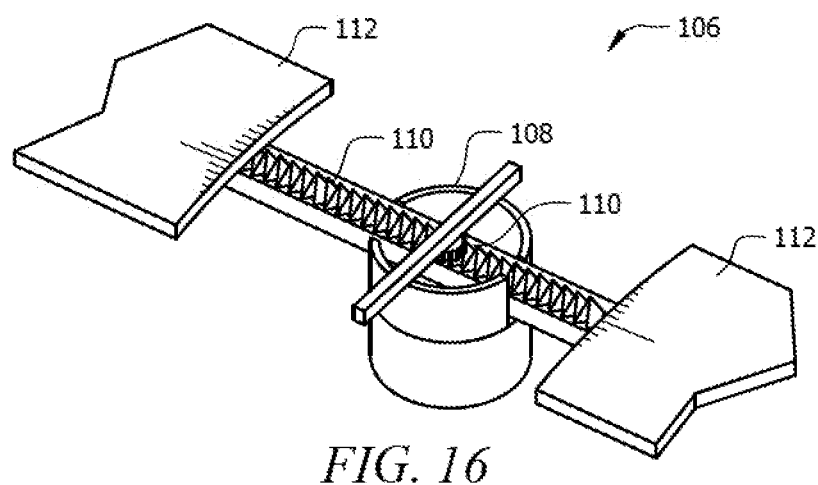

FIG. 16 is a perspective view of a certain embodiment of the upper translation assembly.

Figure 17A:
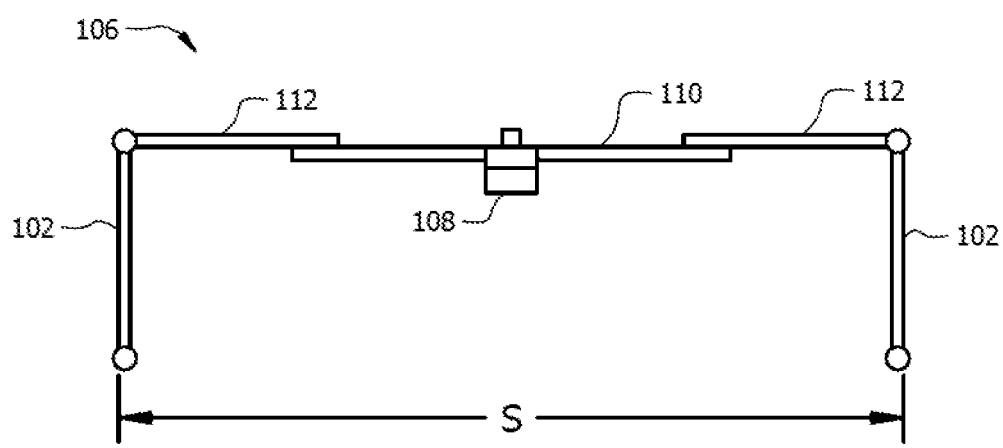

FIG. 17A is front view of a certain embodiment of the upper translation assembly in an extended configuration.

Figure 17B:
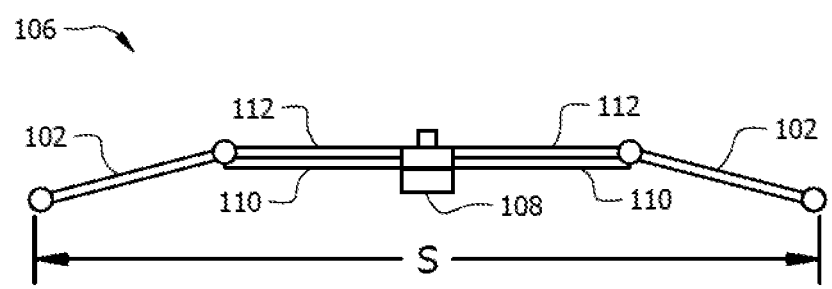

FIG. 17B is front view of a certain embodiment of the upper translation assembly in a retracted configuration.

Figure 18:
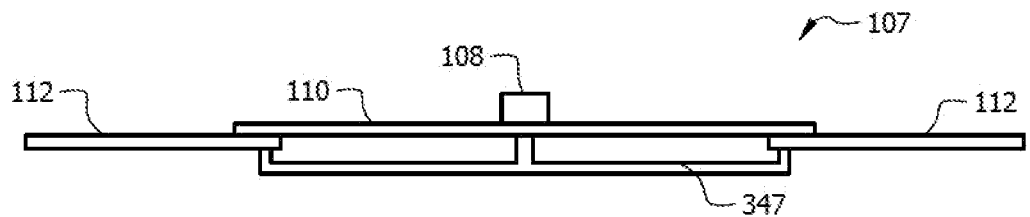

FIG. 18 is a front view of a certain embodiment of the lower translation assembly, having a payload hard point, while in an extended orientation.

Figure 19:
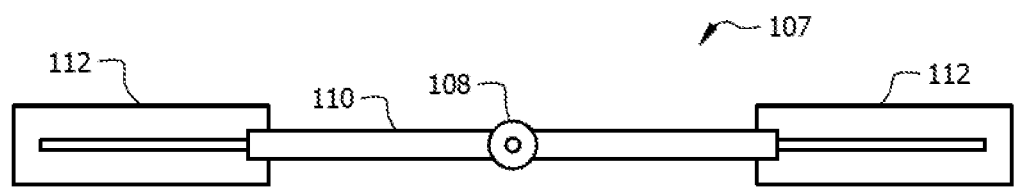

FIG. 19 is a top view of FIG. 18.

Figure 20:
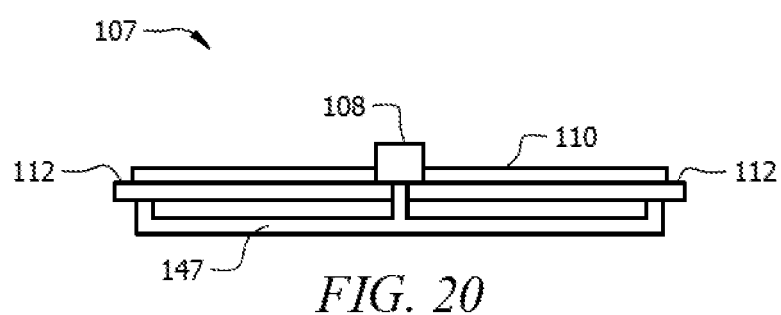

FIG. 20 is a front view of the lower translation assembly shown in FIG. 18 while in a retracted orientation.

Figure 21:
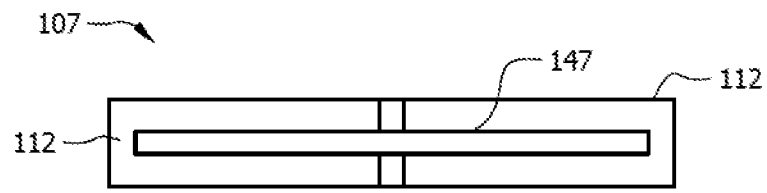

FIG. 21 is a bottom view of FIG. 20.

Figure 22:
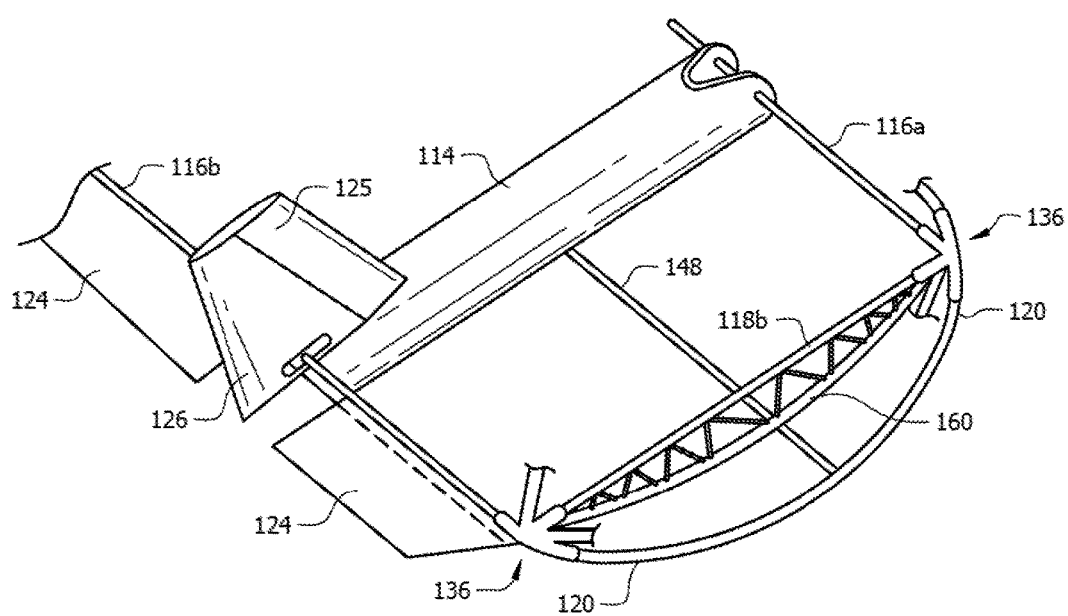

FIG. 22 is a rear perspective view of the starboard side of a certain embodiment of the present invention showing the internal structural components of the aircraft.

Figure 23A:
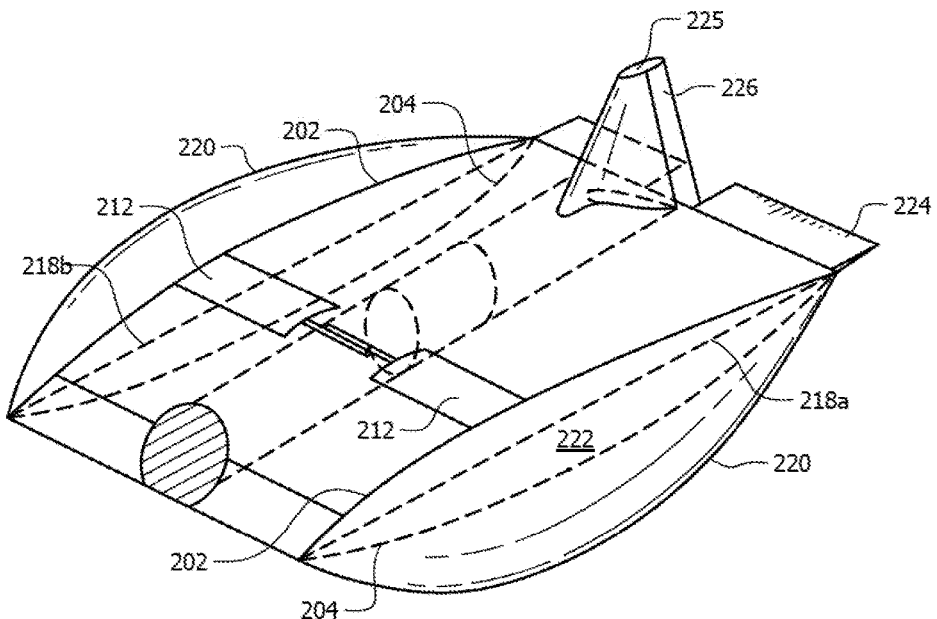

FIG. 23A is a perspective view of a certain embodiment of the present invention having a variable chord length.

Figure 23B:
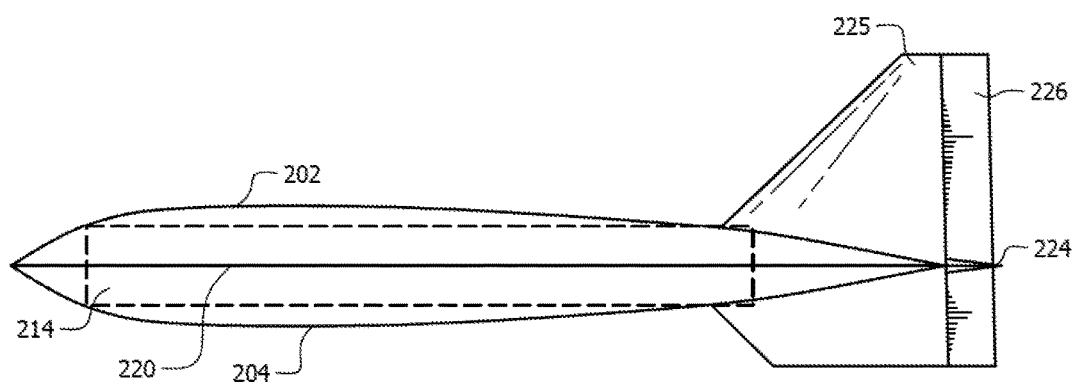

FIG. 23B is a side view of a FIG. 23A.

Figure 24:
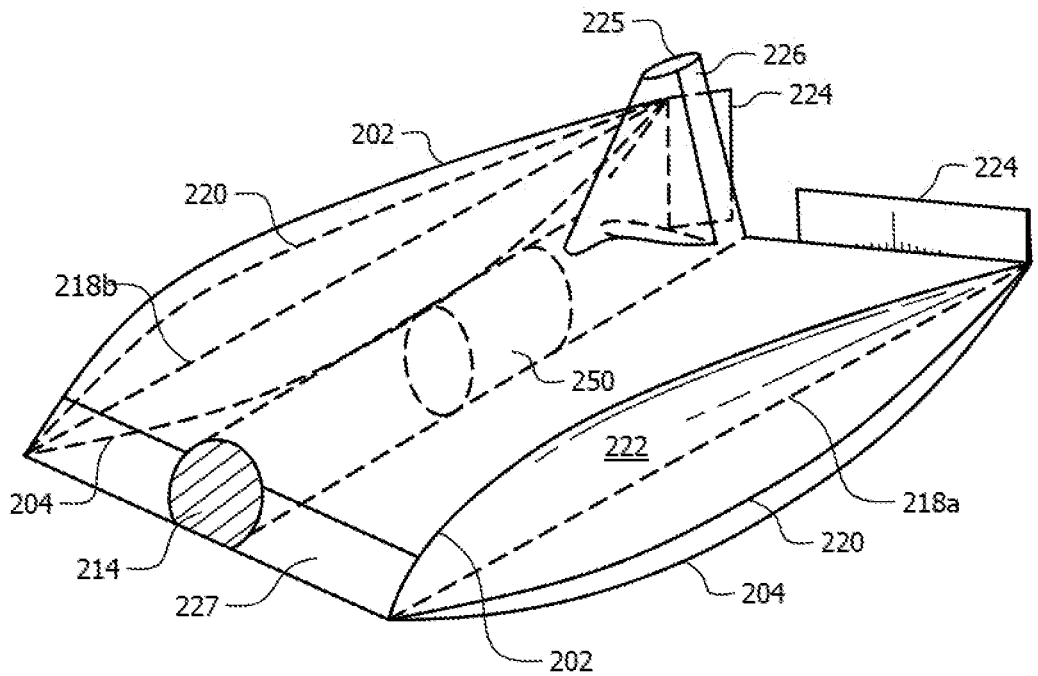

FIG. 24 is a perspective view of a certain embodiment of the present invention.

Figure 25:
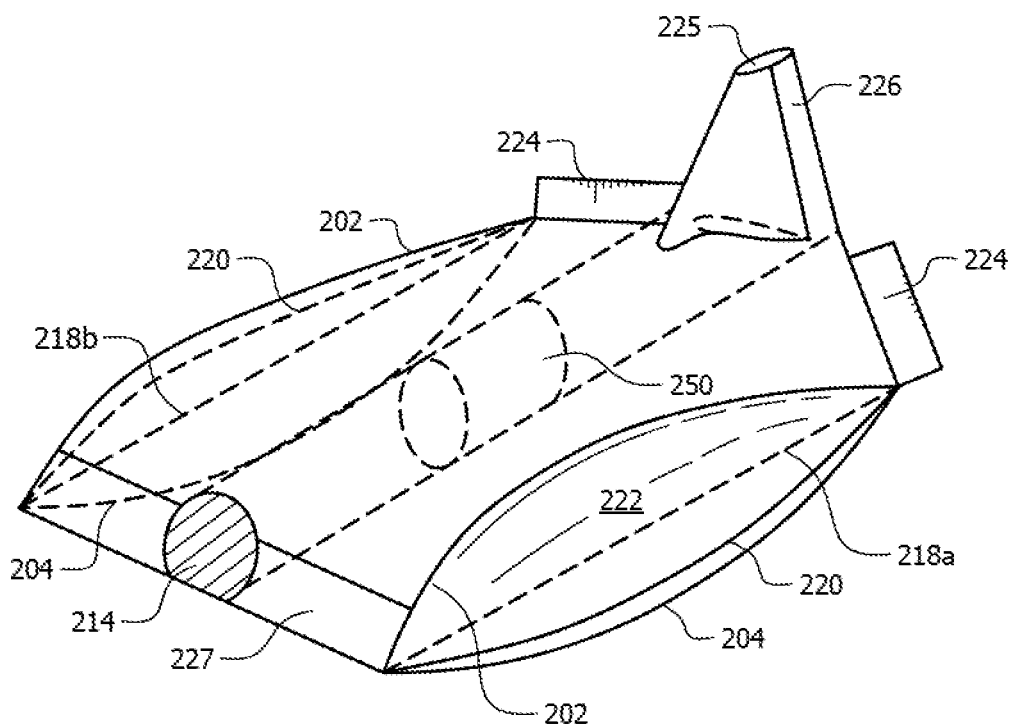

FIG. 25 is a perspective view of a certain embodiment of the present invention.

FIG. 26 is frontal view of a certain embodiment in the LTA configuration. The translation assemblies are removed from the figure for clarity.

FIG. 27 is a frontal view of the embodiment in FIG. 26 with the telescoping leading and trailing edge struts telescoped inward to shorten the length of each strut in preparation for storage. The envelope and translation assemblies are removed from the figure for clarity.

FIG. 28 is a frontal view of the embodiment from FIGS. 26 and 27 with the envelope extension arms collapsed, the distal ends of the starboard side longerons brought together, and the distal ends of the port side longerons brought together to allow the longerons to be easily wrapped around the core of the aircraft. The envelope and translation assemblies are removed from the figure for clarity.

FIG. 29 is a frontal view of the longerons wrapped around the core to allow for easy storage and transportation of the aircraft. The envelope and translation assemblies are removed from the figure for clarity.

Figure 30:
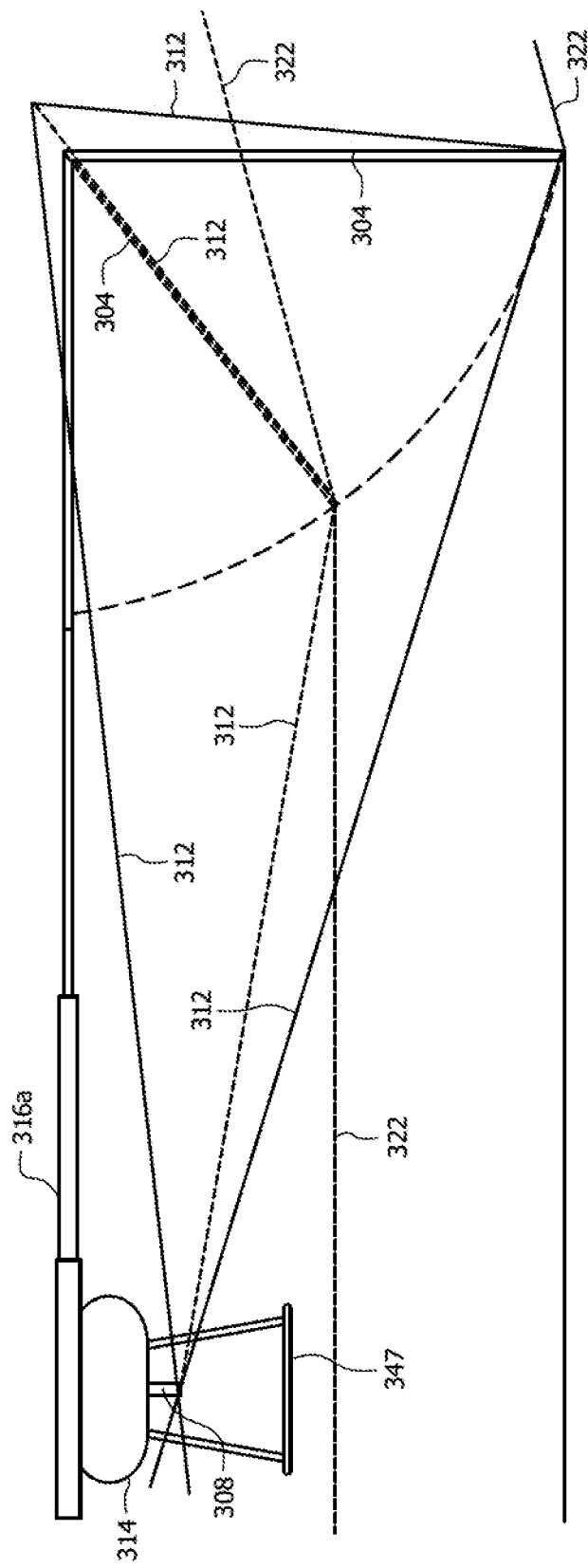

FIG. 30 is a partial frontal view of a certain embodiment of the aircraft employing the flexible translation assembly illustrating the movement of a bottom longeron, from a vertical orientation, towards the core of the aircraft as the translation strap rotates in a clockwise direction.

Figure 31:
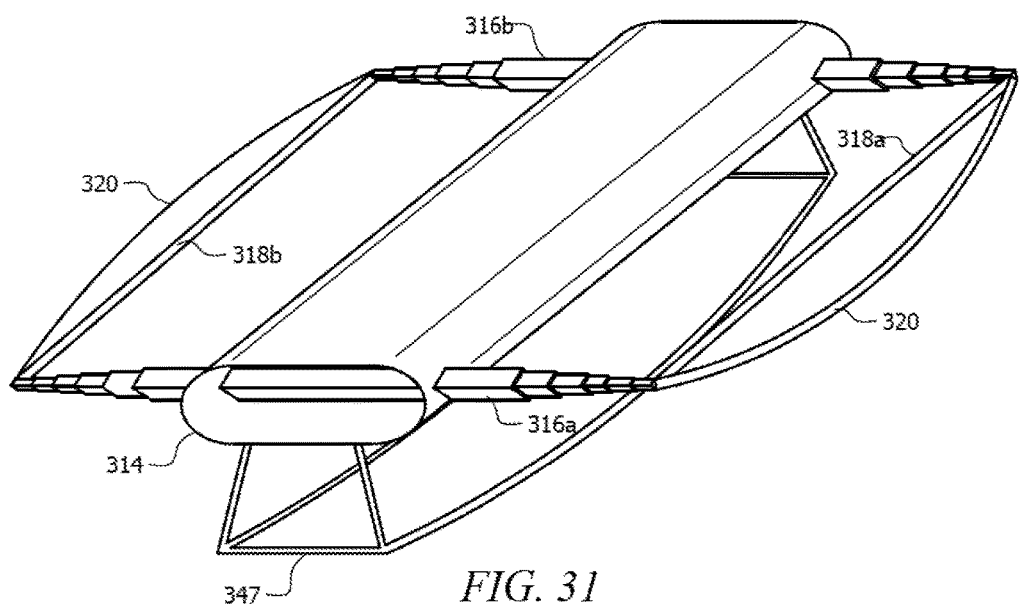

FIG. 31 is a perspective view of an embodiment of the aircraft highlighting the telescoping leading and trailing edge struts attached to an oval-shaped core having an external payload hard point. The longerons, envelope, and translation assembly are removed from the figure for clarity.

Figure 32:
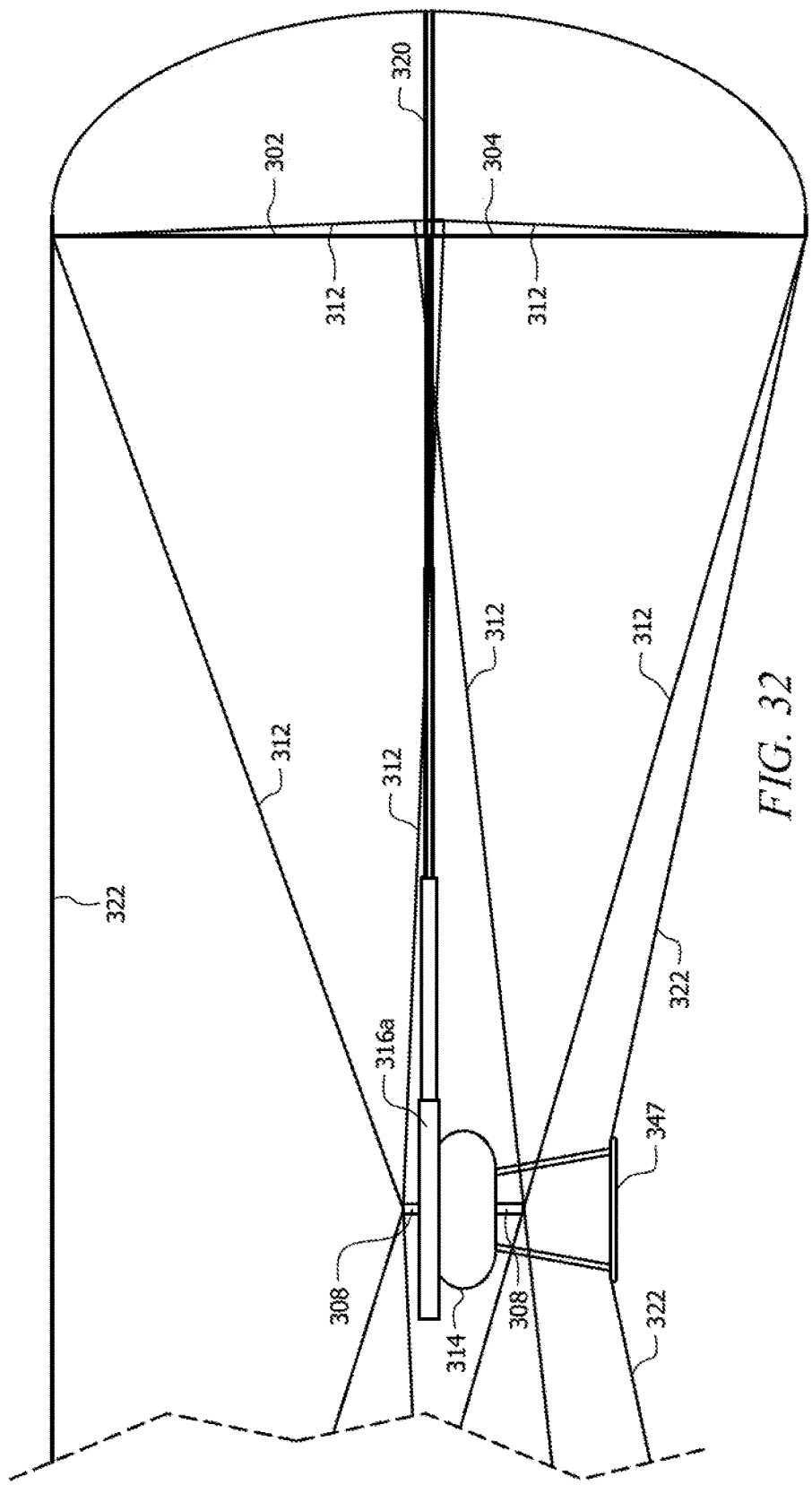

FIG. 32 is a partial frontal view of the port side of the embodiment of FIG. 31 highlighting the flexible translation assemblies and the flexible envelope attached to the external payload hard point.

Figure 33:
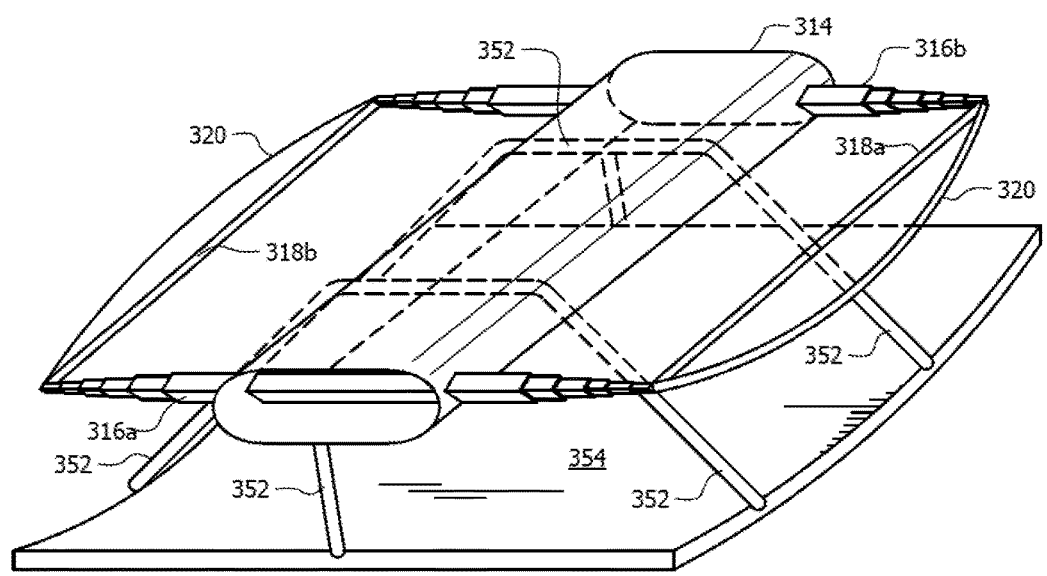

FIG. 33 is a perspective view of a certain embodiment having a cargo pallet attached to the aircraft.

FIG. 34 is a frontal view of a certain embodiment highlighting the bottom port side of the flexible envelope.

FIG. 35 is a sectional view of the highlighted portion in FIG. 34, illustrating the accordion-like surface.

FIG. 36 illustrates how the accordion-like surface of the section of the envelope expands as the aircraft transforms between the LTA configuration and a HTA configuration.

FIG. 37 illustrates how the accordion-like surface of the section of the envelope expands as the aircraft transforms between the LTA configuration and the dash configuration.

FIG. 38 is a frontal view of a certain embodiment of the present invention having a dihedral wing shape.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Glossary of Claim Terms

Envelope: is a lightweight flexible material.

Chord Line: is a straight line extending between the leading edge and trailing edge of the envelope.

Heavier-Than-Air Configuration: is a configuration of the aircraft that cannot maintain altitude without moving through a medium to create Bernoulli lift, changing the angle of attack, or providing vertical thrust.

Lighter-Than-Air Configuration: is a configuration of the aircraft that has a buoyancy to weight ratio greater than 1:1.

Longeron: is a structural member of the aircraft.

Outrigger: is a rod or bar forming part of a framework and designed to resist compression that extends in generally the same direction as the longitudinal axis of the aircraft.

Payload Hard Point: is an attachment point for payloads or instruments carried on the aircraft.

Propulsion System: is a system capable of moving the aircraft through a medium.

Strut: is a rod or bar forming part of a framework and designed to resist compression.

The present invention is a variable geometry aircraft capable of morphing its shape from a buoyant craft having a symmetric cross-section to an asymmetric lifting body configuration or to a low camber symmetric shape. Additionally, the aircraft is capable of achieving any shape between the buoyant symmetric cross-section and the low camber symmetric shape. The convertibility of the present invention provides a unique combination of attributes of both a fixed wing HTA aircraft and a LTA aircraft allowing indefinite mission durations, low energy station keeping and the ability to glide or dash at relatively high velocities when equipped with a propulsion system (the term "dash" herein refers to this high speed mode where the aircraft has a symmetric, low coefficient of drag configuration). Additionally, the aircraft is highly portable by folding into a transportable configuration, light weight, relatively silent in operation, inexpensive to produce and operate, and has a unique structure that allows it to operate even if the gas envelope is penetrated. Although there are numerous other aircraft technologies, this device can operate across a number of operating envelopes and performs multiple roles very well without significant compromise (see Table 1 below). This ability is facilitated by the unique internal structural elements of the aircraft.

TABLE 1

Table 1: Aircraft Comparison

| Aircraft | Velocity Range (kts) | Operating Cost | Complexity | Operational Duration |
|---|---|---|---|---|
| Rotor/VTOL | 0-115 (217*) | High | High | Low |
| Fixed Wing | 50+ | Low-High | Low-Med | Low |
| LTA | 0-30 (60*) | Low | Low-Med | High |
| Hybrid LTA** | 0-40 | High | High | Med |
| Present Invention | 0-200 | Low | Low | High |

*World Record
**Only viable recorded device defined in U.S. Pat. No. 5,005,783

Table 1 above illustrates that the present invention fills a unique performance niche in that, with low complexity and high reliability, a unique and broad range of performance feats can be achieved. The unique design features of the present design, taken in combination, make it an improvement on the technology for LTA aircraft, hybrid LTA aircraft, and fixed wing flying bodies, especially as applied to unmanned vehicles.

The present invention includes a flexible envelope enclosing a variable rigid inner structure. The envelope may include internal bladders adapted to contain low-density buoyant gas, such as Helium.

In an embodiment, the novel structure includes a central, tubular core containing a propulsion system. The propulsion system is preferably an electric ducted fan motor. An embodiment may include several cores depending on the size of the aircraft and the mission requirements. In an embodiment, such as a non-powered glider version, the core(s) serves as the structural backbone for the envelope while also acting as gas tank(s). The core further provides attachment points for additional equipment and may serve as a lead component in adjusting the aircraft's chord length.

The core(s) can also serve as a key structural base for a dual outrigger configuration to support the leading and trailing edges. The two outriggers are preferably generally parallel to the core and attach at the ends of the leading and trailing edge struts. The outriggers provide structure as well as an attachment point for mounting the moveable longerons.

The moveable longerons are adapted to pivot between a more vertical orientation and more horizontal orientation such that the camber and thickness of the aircraft can be altered based on flight needs. The camber adjustment assemblies (also referred to as translation assemblies) can be mounted both above and below the core of the aircraft such that both the top and bottom surfaces of the aircraft are variable.

When the aircraft is in the LTA configuration—typically a large buoyant shape, the craft has all of the traditional characteristics of a blimp for station keeping or slow speed flight. By adjusting the shape of the lower surface to achieve an airfoil shape, the craft can augment the buoyancy by creating aerodynamic lift to increase its duration of flight or act as a conventional unpowered glider. Finally, by reshaping both the upper and lower surfaces, the craft can achieve a relatively low drag configuration for high velocity (in excess of 200 km/hr for smaller aircraft sizes) to rapidly reposition itself or fly high velocity missions. In a certain embodiment, the design includes a leading edge shield to protect the envelope in high velocity flight.

The aircraft includes one or more gas containers coupled to a gas delivery and preferably retrieval system. The gas delivery system fills the internal volume of the flexible envelope with lighter than air gas, while the retrieval system is adapted to recover any gas already contained in the internal volume of the flexible envelope. These two systems allow for easy transformation between the LTA and HTA configurations. In an embodiment, the aircraft may include a ventilation system for venting gas out of the aircraft and into the atmosphere.

Example of the Present Invention with a Fixed Chord Length

Figure 1:
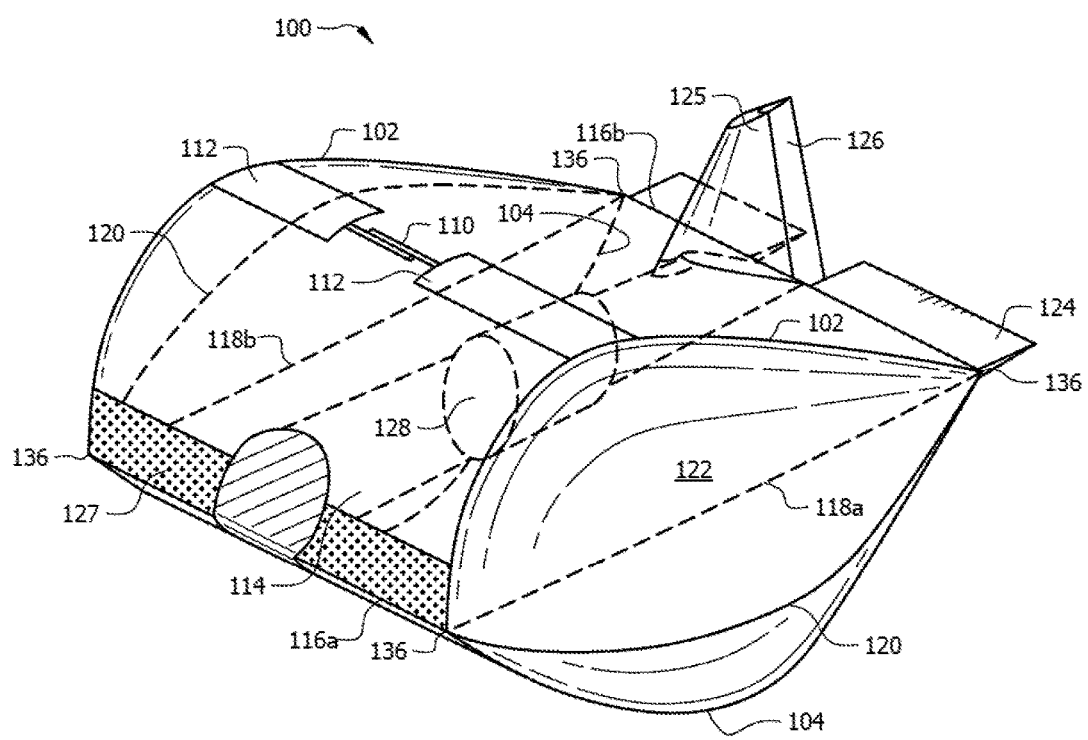
FIG. 1 is a perspective view of a certain embodiment of the present invention in an LTA configuration.

As shown in FIG. 1, an embodiment of the present invention, generally denoted by reference numeral 100, includes flexible envelope 122 with movable longerons 102, 104. Aircraft 100 has two moveable upper longerons 102 and two moveable lower longerons 104. The movement of the longerons adjusts the camber and thickness of the upper and/or lower surfaces to achieve differing body shapes. The longerons are non-linear, preferably having an arc shape. In addition, the longerons preferably have a fixed length to decrease complexity of the aircraft, however, length-adjusting longerons are considered. The length of the longerons extends preferably in a direction generally parallel to the longitudinal axis of the aircraft.

The movement of the longerons and therefore camber-transformation can be accomplished while the craft is airborne and does not require any ground support equipment. The transformation changes both the lift and drag characteristics of the craft to alter the flight characteristics. In a certain embodiment, only the upper or only the lower longerons are moveable to decrease the complexity and weight of the aircraft.

Moveable upper longerons 102 and moveable lower longerons 104 are each in communication with upper translation assembly 106 and lower translation assembly 107, respectively. The translation assemblies each include motor 108 (see FIGS. 16-21), gear assembly 110, and extendable arms 112. When the translation assembly is in a fully extended configuration, the moveable longerons are in a generally vertical orientation, as shown in FIGS. 1 and 17A, which increases the camber and affects the lift and drag characteristics of the aircraft. When the translation assembly is in a retracted position, the moveable longerons are pulled inwards towards the longitudinal axis of the aircraft, as shown in FIGS. 2, 5B, 5D, and 17B, which decreases camber and thickness.

The additional structural components contributing to the present invention's superior functionality include cylindrical core 114 extending the length of the aircraft in the longitudinal direction. In addition to the core, is a rigid, preferably rectangular, base structure. The base structure includes leading and trailing edge struts, collectively denoted by reference numeral 116, connected to port and starboard outriggers, which are collectively denoted by reference numeral 118. The design also includes envelope expansion arms (also referred to as "slack managers") 120 having an adjustable length and a generally arc shape. There is preferably one envelope expansion arm along the port side of the aircraft and one along the starboard side of the aircraft where each is capable of extending outward away from the central longitudinal axis of the aircraft to alter the span of the aircraft. As shown in FIGS. 1-5, flexible envelope 122 encloses the base structure, envelope expansion arms, and longerons.

The moveable longerons, envelope expansion arms, and flexible envelope allow the aircraft to operate in various configurations. The position of the longerons is not limited to the fully extended or fully retracted position. Rather, the longerons can be configured in any state of extension to achieve optimal aerodynamic performance to meet a particular mission's requirements. At one extreme, the longerons can be positioned to transform the aircraft into a symmetric buoyant configuration, as is typical for LTA aircraft, and shown in FIGS. 1, 4, and 5. This configuration includes both upper translation assembly 106 and lower translation assembly 107 in the fully extended position to place moveable upper longerons 102 and lower longerons 104 in a generally vertical orientation. The non-linear arc shape of the longerons increases the thickness of the aircraft when in a more vertical orientation.

Figure 2:
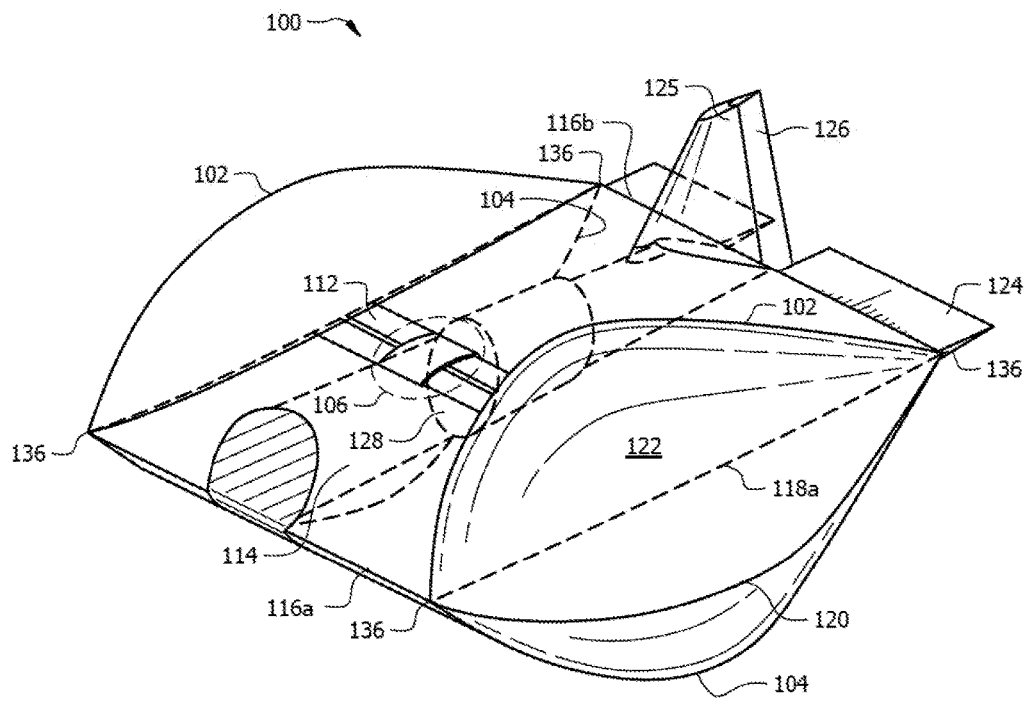
FIG. 2 is a perspective view of an embodiment of the present invention in a negative lift configuration.
Figure 3:
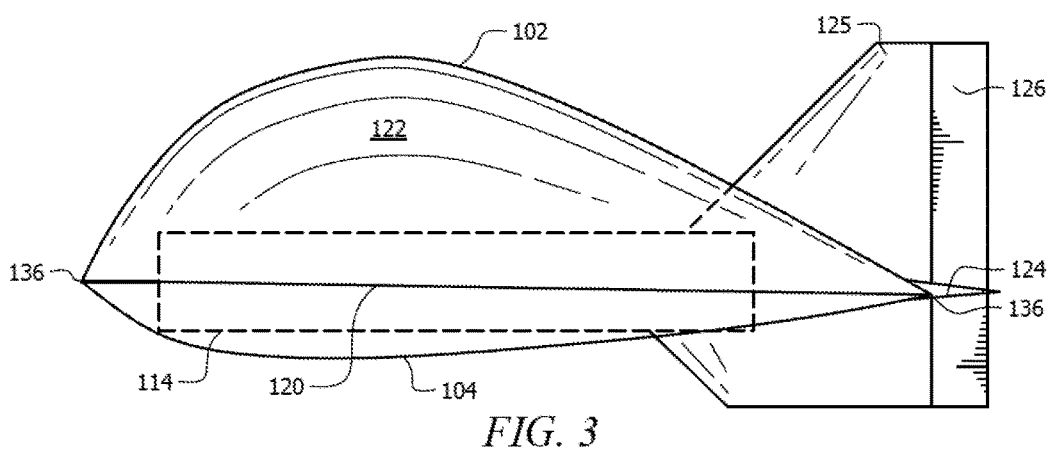
FIG. 3 is a side view of an embodiment of the present invention shown in a positive lift configuration.
Figure 4A:
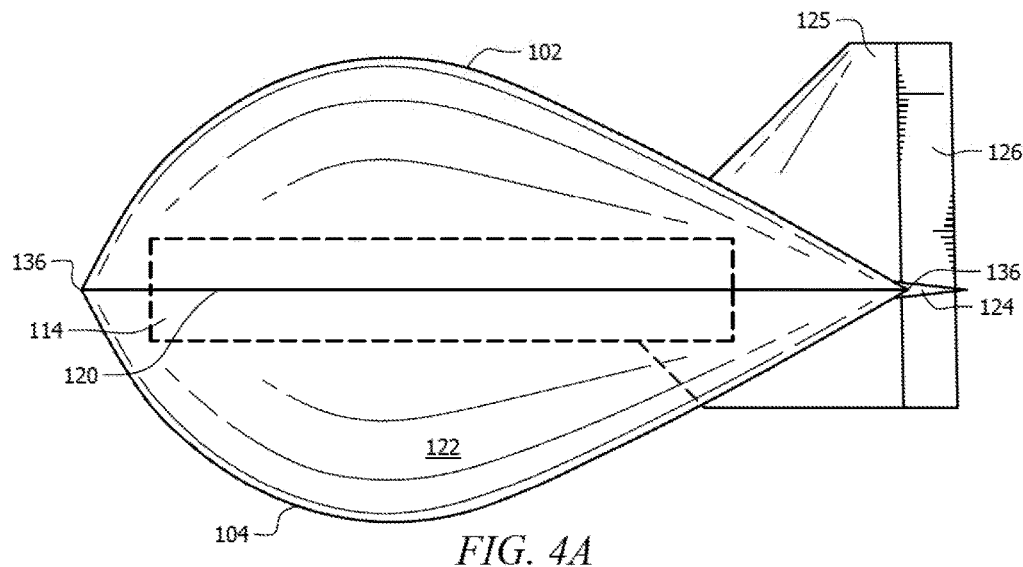
FIG. 4A is a side view of the present invention in an LTA configuration.
Figure 4B:
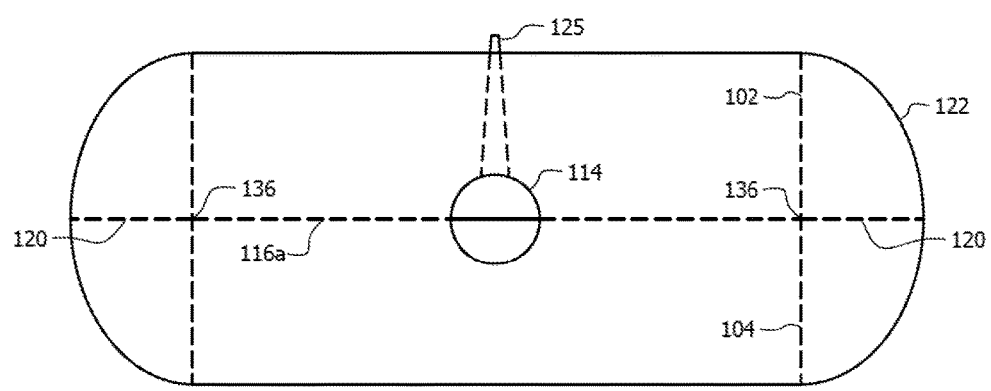
FIG. 4B is a front view of the present invention in an LTA configuration.
Figure 5A:
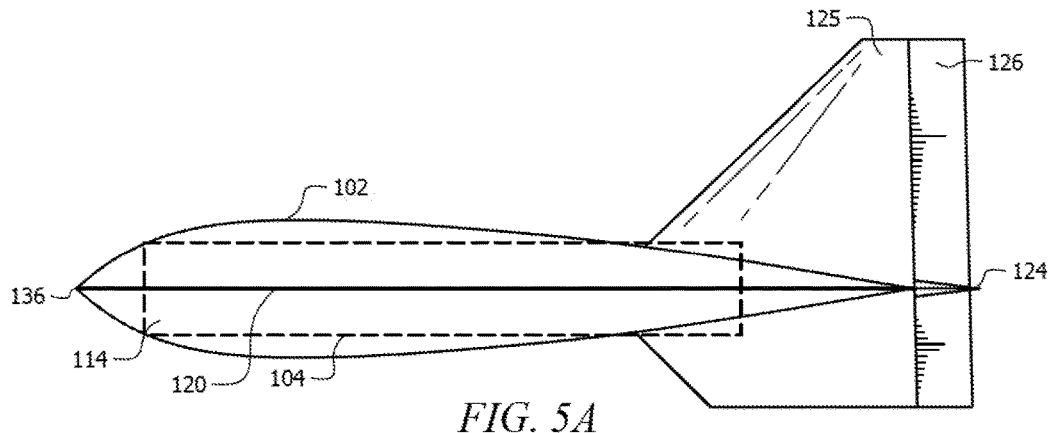
FIG. 5A is a side view of the present invention in the dash configuration.
Figure 5B:
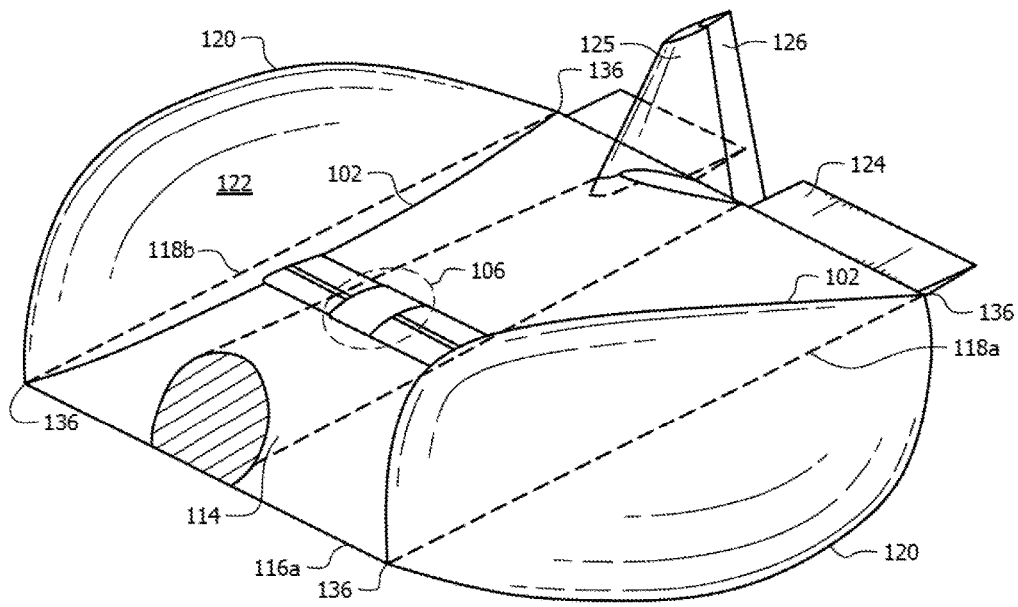
FIG. 5B is a perspective view of the present invention in the dash configuration.
Figure 5D:
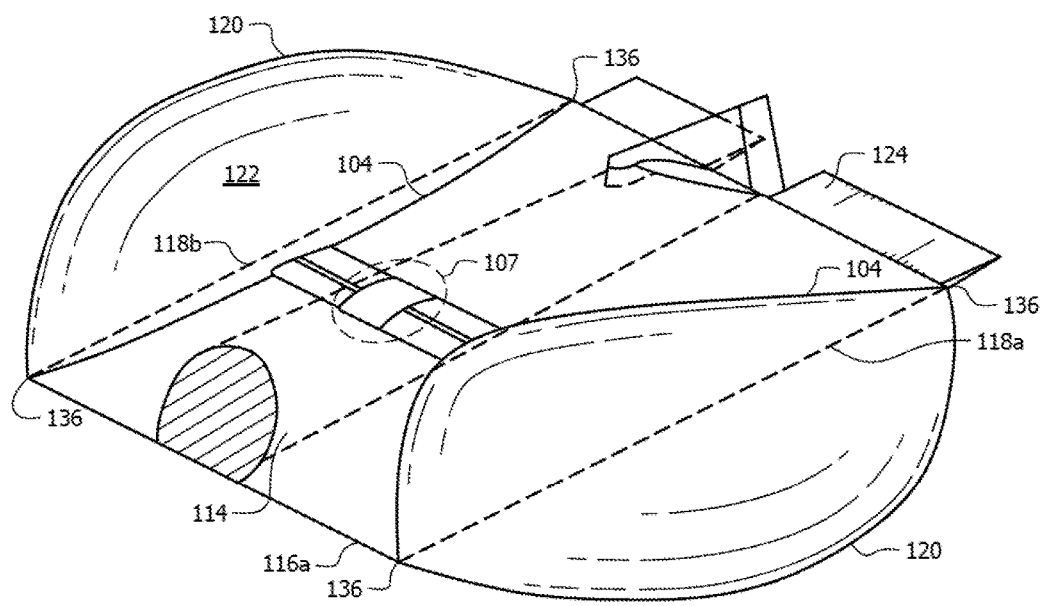
FIG. 5D is a bottom perspective view the present invention in the dash configuration.

Another possible configuration is a negative lift configuration, as shown in FIG. 2. The configuration is achievable by retracting upper translation assembly 106 and extending lower translation assembly 107. Likewise, the aircraft can achieve a positive lift configuration, as shown in FIG. 3, by extending upper translation assembly 106 and retracting lower translation assembly 107.

The truly innovative and functionally distinct orientation found in no other LTA to HTA convertible aircraft, is the dash configuration. As shown in FIGS. 5A-5D, the dash configuration is an approximately symmetric HTA configuration achieved when both upper translation assembly 106 and lower translation assembly 107 are in the retracted position. In this position, the upper and lower moveable longerons 106, 107 are pulled inwardly towards core 114 where they reside in a more horizontal orientation to substantially reduce the thickness and camber of the aircraft.

The variability of the aircraft imposes several requirements on flexible envelope 122. For example, flexible envelope 122 must be flexible to accommodate the shape morphing capability, have a very low permeability to Helium, and be lightweight. As a result, the envelope is preferably made from a plastic sheet material. This material is prone to two negative features that will affect the performance of the LTA in the dash configuration and impact performance overall. One is flutter of the envelope, which increases drag and causes aerodynamic instability. The second is the possibility of penetration of the envelope by airborne hazards (such as insects, birds, or debris) at the high speeds. The possibility of penetration may be avoided by the installation of leading edge shields 127 that are hinged on the leading edge strut and can expand or contract with the movement of the envelope. See FIG. 1. Additionally, mechanical stops can be installed to reflect the shape of the leading edge in the dash configuration to remove the possibility of flutter at high speeds. Flutter may also be managed by management of internal gas pressure and/or the addition of multiple longerons or other internal structural elements.

Stability and Control Components

Aircraft 100 also includes flight stability and control components, such as elevons 124 (which may be substituted by an elevator/aileron configuration), vertical stabilizer 125, rudder 126, leading edge shield 127, and propulsion system 128. The pair of rear-mounted elevons 124 perform the function of both elevators and ailerons to control pitch and roll. Both are controlled via servos and a microprocessor mounted to the core assembly. Yaw control/directional stability is provided through rudder 126 mounted to vertical stabilizer 125.

An embodiment may include rudder 126 configured to project into the ducted fan airstream to provide a degree of thrust vectoring for very low speed flight and low velocity maneuvering. It is envisioned that the larger sizes of this LTA would employ thrust vectoring entirely as its method of directional control for certain applications. Thrust vectoring with multiple motors and larger sizes would significantly reduce the weight of the aircraft and provide superior maneuvering capability over conventional control surfaces.

Aircraft Performance

Due to the variable geometry capabilities, the aircraft will have a range of performance characteristics spanning from a high Coefficient of Drag (CD) seen in the dirigible configuration to a relatively low CD seen in the flying wing configuration. The lift characteristics will also vary from a lift neutral symmetric configuration to a positive lift or negative lift airfoil shape to suit mission requirements. These configurations can be changed dynamically while airborne to suit mission needs. The driving requirement for the aircraft is the desired dash speed of approximately 200 kts for small aircraft sizes. The assessment of performance and structural characteristics has been completed for three different configurations of craft defined by the length or chord of the aircraft and the span of the central, airfoil shaped portion of the craft, which excludes the half blimp shape on each end of the craft. The alternative driving characteristic is to support large payloads, but this requirement does not drive motor size in the powered or un-powered glider configuration.

Figure 6:
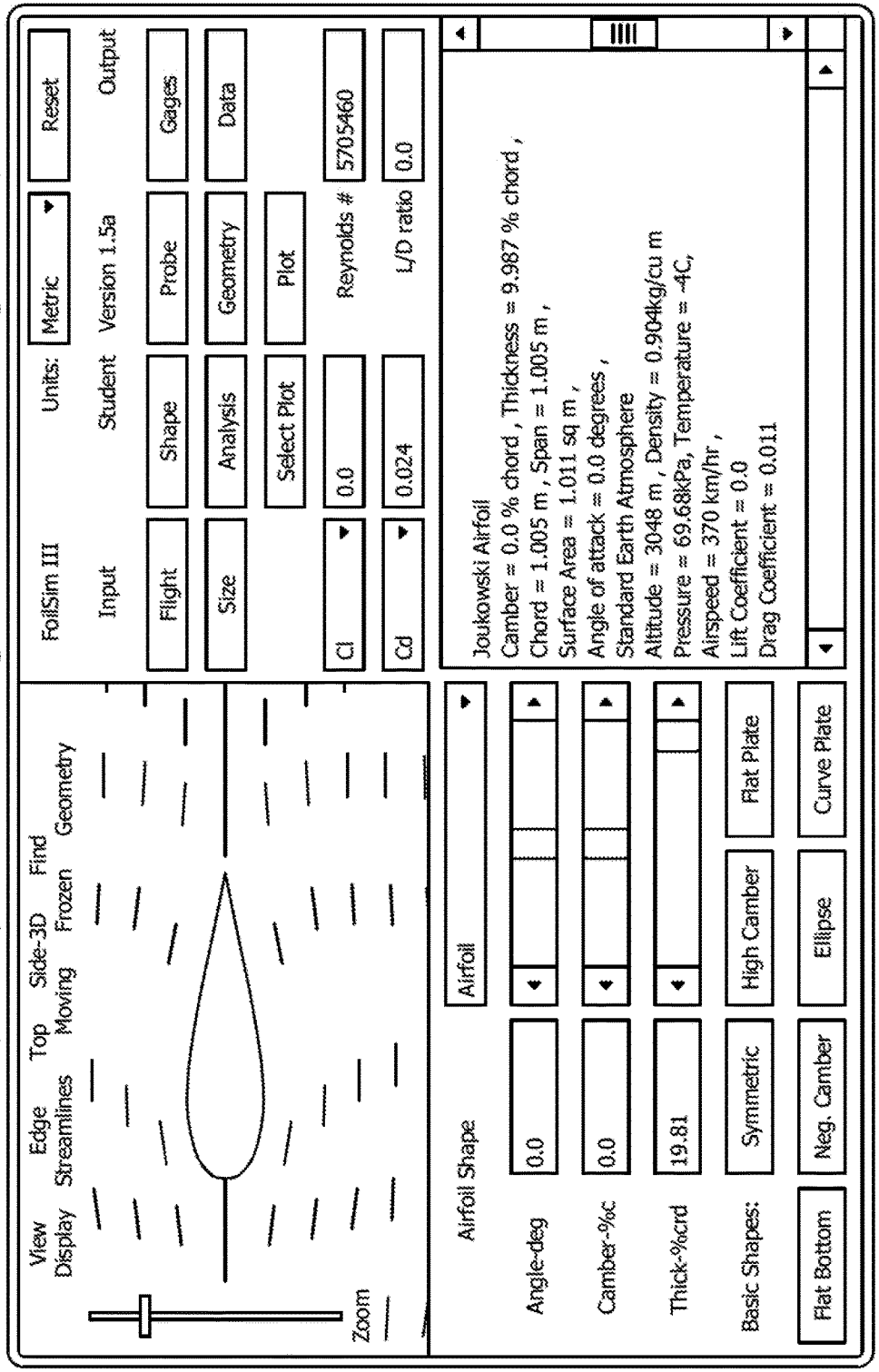

Dash Speed Calculation:

A novel characteristic of this aircraft is the speed at which the aircraft is capable of traveling when in the dash configuration and powered by a propulsion system. The equation in Table 2 is used to calculate the amount of force required to move a body through a viscous medium. This is used to derive the motor size to achieve the required speed; thus driving other factors such as weight, power, envelope size, etc. The initial calculation is to determine the minimum motor output required to achieve the desired maximum dash velocity of 230 mph at a cruise altitude of 10,000 feet MSL. Using the desired dash speed shown in Table 2 below, the resultant drag force, or the required motor output to overcome that drag, is determined. Using a mathematical simulation tool (FoilSim) available from NASA, the CD for various configurations of the aircraft from a large chord to length ratio to a small chord to length ration is calculated. As seen in Table 3, the drag force exhibited by a low chord to length ratio with a highly symmetric profile yields the lowest CD and therefore, the lowest motor size to achieve the desired speeds. The model output corresponding to this performance is shown in FIG. 7. These values are highlighted in the Drag Coefficient section of Table 3 for each of three configurations shown in FIGS. 6, 7, and 8. Also highlighted in the Drag Force and Required Motor Output sections of Table 3 are the best performance conditions for the LTA dash mode. It is apparent that the maximum LTA speed in the highly buoyant configuration (high thickness to chord length ratios) will be nowhere near those achieved in the dash configuration. FIGS. 6 and 7 show the output for two of the symmetric configurations examined using the FoilSim simulation program. FIG. 8 shows how CD increases in the asymmetric configuration while also experiencing a corresponding increase in the coefficient of lift (CL). The data shows that in this configuration, significant aerodynamic lift can be achieved by this design at 0 degree AoA. Higher lift performance can be achieved at higher AoA.

TABLE 2

| | | |
|---|---|---|
| Desired speed in knots: | | 200 kys = 102.88 m/sec |
| $Fr = .5(C_D)*\rho_{air}*v^2*A_s$ | | Assume Altitude of 10000 ft and Speed of 250 kts |
| | | Altitude 10000 ft = 3048 m |
| | | Speed: 230 mph = 200 kts = 370 km/hr |
| 102.88 | v | Velocity (m/Sec): in this model, this is an input characteristic and drives the motor size. |
| 0.4135 | $\rho_{air}$ | Density of Air: is a function of atmospheric conditions and varies |
| Table | A | Surface Area (m$^2$) |
| Table | $C_D$ | Coefficient of Drag: using FoilSim III |

TABLE 3

10000 Ft Standard Lapse

| Chord (m) | Camber (% of Chord) | Span (m) | Drag Coefficient ($C_D$) | | | | | | Drag Force (N) | | | | | | Required Motor Output (gmf) 1N = 1.02 kgF = .225 lbf | | | | | |
|---|---|---|---|---|---|---|---|---|---|---|---|---|---|---|---|---|---|---|---|---|
| | | | 10 | 12 | 14 | 16 | 18 | 20 | 10 | 12 | 14 | 16 | 18 | 20 | 10 | 12 | 14 | 16 | 18 | 20 |
| 1 | 0 | 1 | 0.011 FIG. 2 | 0.015 | 0.019 | 0.022 | 0.023 | 0.024 FIG. 1 | 24.1 | 32.8 | 41.6 | 48.1 | 50.3 | 52.5 | 2455.3 | 3348.1 | 4241.0 | 4910.6 | 5133.8 | 5357.0 |
| | 1 | 1 | 0.016 | 0.02 | 0.024 | 0.027 | 0.029 | 0.03 | 35.0 | 43.8 | 52.5 | 59.1 | 63.5 | 65.6 | 3571.4 | 4464.2 | 5357.0 | 6026.7 | 6473.1 | 6696.3 |
| | 2 | | 0.03 | 0.034 | 0.038 | 0.041 | 0.043 | 0.045 | 65.6 | 74.4 | 83.2 | 89.7 | 94.1 | 98.5 | 6696.3 | 7589.1 | 8482.0 | 9151.6 | 9598.0 | 10044.4 |
| | 3 | | 0.052 FIG. 3 | 0.056 | 0.06 | 0.063 | 0.065 | 0.066 | 113.8 | 122.5 | 131.3 | 137.9 | 142.2 | 144.4 | 11606.9 | 12499.7 | 13392.6 | 14062.2 | 14508.6 | 14731.8 |
| 2 | 0 | 2 | 0.01 | 0.014 | 0.017 | 0.02 | 0.021 | 0.022 | 87.5 | 122.5 | 148.8 | 175.1 | 183.8 | 192.6 | 8928.4 | 12499.7 | 15178.3 | 17856.8 | 18749.6 | 19642.5 |
| | 1 | 2 | 0.015 | 0.019 | 0.023 | 0.025 | 0.027 | 0.028 | 131.3 | 166.3 | 201.3 | 218.8 | 236.3 | 245.1 | 13392.6 | 16963.9 | 20535.3 | 22321.0 | 24106.7 | 24999.5 |
| | 2 | | 0.029 | 0.033 | 0.037 | 0.039 | 0.041 | 0.043 | 253.8 | 288.9 | 323.9 | 341.4 | 358.9 | 376.4 | 25892.3 | 29463.7 | 33035.0 | 34820.7 | 36606.4 | 38392.1 |
| | 3 | | 0.051 | 0.054 | 0.058 | 0.061 | 0.063 | 0.064 | 446.4 | 472.7 | 507.7 | 534.0 | 551.5 | 560.2 | 45534.8 | 48213.3 | 51784.7 | 54463.2 | 56248.9 | 57141.7 |
| 4 | 0 | 4 | 0.01 | 0.013 | 0.016 | 0.018 | 0.02 | 0.021 | 350.1 | 455.2 | 560.2 | 630.2 | 700.3 | 735.3 | 35713.6 | 46427.6 | 57141.7 | 64284.4 | 71427.1 | 74998.5 |
| | 1 | 4 | 0.015 | 0.018 | 0.021 | 0.024 | 0.025 | 0.026 | 525.2 | 630.2 | 735.3 | 840.3 | 875.3 | 910.3 | 53570.3 | 64284.4 | 74998.5 | 85712.5 | 89283.9 | 92855.3 |
| | 2 | | 0.029 | 0.032 | 0.036 | 0.038 | 0.04 | 0.041 | 1015.4 | 1120.4 | 1260.5 | 1330.5 | 1400.5 | 1435.5 | 103569.3 | 114283.4 | 128568.8 | 135711.5 | 142854.2 | 146425.6 |
| | 3 | | 0.05 | 0.054 | 0.057 | 0.059 | 0.061 | 0.063 | 1750.7 | 1890.7 | 1995.8 | 2065.8 | 2135.8 | 2205.8 | 178567.8 | 192853.2 | 203567.3 | 210710.0 | 217852.7 | 224995.4 |

Propulsion System

The motor size and number of motors are derived for each of the three configurations to determine if commercially available Electronic Ducted Fan (EDF) motors can be used in the design. The data in Table 3 proves that a single 3000 gmf motor is sufficient to achieve the desired velocity for the 1-meter-by-1-meter sized aircraft. This size motor is readily available for Radio Control (RC) aircraft. For larger size craft, the number of core units would be increased to provide the required thrust. This assessment shows that two core units of roughly the same size as above will propel a 2-meter-by-2-meter design. Larger motors or core combinations of four motors would be required for the 4-meter-by-4-meter design. In an embodiment, any number and type of motors may be used as is known to a person having ordinary skill in the art.

Glider Embodiment

In a certain embodiment, the aircraft may or may not include a propulsion system, such the HTA configuration results in a traditional or powered glider. The glider embodiment of the present invention reflects a logical adaptation of this powered design to a non-powered glider design to support a system that can gain sufficient altitude (through the unique LTA configuration), such that traditional shore-based Reception, Staging, Onward Movement, and Integration (RSOI) logistics depots could be overflown and bypassed. Additionally, the glider is capable of ferrying a variety of supply classes directly to the point of need using the wing load management system with an order of magnitude cost reduction over current methods. Moreover, the design organically incorporates an all-weather launch capability that enables scalable parallel sorties for high system throughput. The system is also collapsible to facilitate stowage in standard shipping containers, and unloaded with minimal effort, thereby eliminating the need for logistical support vehicles at the point of use.

The wing load management system allows the glider embodiment of the aircraft to deliver large payloads by distributing the wing load through a plurality of rigid support ribs and flexible strap spars. While the wing load management system is extremely useful for the glider embodiment since glider payload's are often much heavier than the aircraft, the system may also be incorporated into the embodiment having a propulsion system. The wing load management system is further described under the Base Structure section.

As provided in Table 4 below, the glider embodiment provides an excellent solution in all areas and is clearly superior in the areas of cost/complexity to deploy, mission adaptability, and all-weather performance.

TABLE 4

| PARAMETER | FIXED WING GLIDER | AUTO GYRO | CONTROLLED PARACHUTE/SOFT GLIDER | TRADITIONAL LTA | PRESENT INVENTION |
|---|---|---|---|---|---|
| RECURRING UNIT COST | Moderate | High | Low | Low | Low |
| SUPPORT/ DEPLOYMENT COST | High | High | Low | Low | Low |
| COMPLEXITY | Moderate | High | Low | Low | Low |
| GROUND SUPPORT EQUIPMENT REQUIRED | High Impact - Launch system need to get aircraft to initial altitude. Methods (tow/JATO/ground launch) require extensive ground or shipboard. | High Impact - Launch system need to get aircraft to initial altitude. Methods (tow/air launch) require extensive ground or shipboard. | High to Mod - Air drop from cargo aircraft | Low - generally tethers and securing posts are sufficient for most LTA aircraft | Low - Self deploying system requires only attachment to the cargo pallet, leveling and release. |
| PAYLOAD CAPACITY AS A FUNCTION OF THE 463L PALLET | Moderate - aircraft would need to be very large to carry full 463L pallet | Moderate - aircraft would need to be very large to carry full 463L pallet | Moderate - aircraft would need to be very large to carry full 463L pallet | Moderate - aircraft would need to be very large to carry full 463L pallet | Moderate - aircraft would need to be very large to carry full 463L pallet |
| CONTROL- LABILITY TO TARGET LOCATION | Moderate - good to target but one landing only | Moderate - good to target but one landing only | Moderate - good to target but one landing only | Low - without power, very difficult to adjust for environment | High - highly adjustable flight path, even w/ environmental condition changes |
| TRANSPORT AND HANDLING CONVENIENCE | Low - even with folding wings or other components, aircraft will require large storage space | Low - even with folding wings or other components, aircraft will require large storage space | High - package similar to traditional parachute | Moderate - may require considerable storage volume | High - shipped in a small, stackable container tube and fully ready to expand and inflate |
| LAUNCH COMPLEXITY | High - Launch to altitude requires significant infrastructure regardless of launch method. | High - Launch to altitude requires significant infrastructure regardless of launch method. | Moderate - process of loading and deployment from drop aircraft well defined but takes cargo aircraft into harm's way. | Moderate - may require considerable storage volume | Low - Self deploying system requires only attachment to the cargo pallet, leveling and release. |
| RETRIEVAL COMPLEXITY | High - Requires extensive clearance area for descent and landing. | High to Mod - Requires moderately large clearance for approach and landing | High to Mod - Requires moderately large clearance for approach and landing | High to Mod - Requires moderately large clearance for approach and landing | Low - Conversion to full or partial LTA allows for vertical descent. |

TABLE 4-continued

| PARAMETER | FIXED WING GLIDER | AUTO GYRO | CONTROLLED PARACHUTE/SOFT GLIDER | TRADITIONAL LTA | PRESENT INVENTION |
|---|---|---|---|---|---|
| LOADING COMPLEXITY/ TIME TO LOAD | High | High | Moderate | Low | Low |
| COMPLEXITY/ TIME TO UNLOAD | High | High | Low | Moderate | Low |
| THROUGHPUT | High | High | Moderate | High | Low |
| COST | | | | | |

Envelope

In an embodiment, the envelope includes an internal reinforcement layer and a secondary containment bag to facilitate Helium recovery. The moveable structural components of the aircraft raise concerns regarding structural members rubbing on a fairly thin plastic surface and ultimately causing the envelope to fail. Therefore, an embodiment includes reinforcement layers 130 located in areas likely to experience increased wear and tear from the moveable internal structure of the aircraft. FIG. 9 illustrates the approximate areas on envelope 122 requiring the addition of reinforcement layers 130. Reinforcement layers 130 are made of Mylar or some other wear resistant, lightweight, and flexible material, to increase the serviceable life of the envelope. In an embodiment, the reinforcement layer is also added at the leading edge and under the translation assemblies to improve tear resistance at possible impact areas from outside debris.

FIG. 10 shows internal panels that create separate gas bladders within the envelope. The internal panels act as flexible walls creating four independent chambers. The internals panels include top panel 131, bottom panel 132, starboard panel 133, and port panel 134. Top panel 131 runs between the outriggers 118 and rests on the central core 114, both of which are not shown to aid in clearly identifying the internal panels. Bottom panel 132 also runs between the outriggers 118, but is located under the central core 114. Both the port and starboard panels 134 and 133 run between the top and bottom longerons 102, 104 on the respective sides of the aircraft. The panels are preferably made from the same material as the envelope, however any lightweight flexible and airtight material known to a person having ordinary skill in the art may be used. These panels aid in the recovery of the low-density gas used in the LTA configuration without venting to the atmosphere, thus conserving the gas for future use. The partition bladders also reduce the possibility of catastrophic gas loss if the envelope integrity is compromised. Additional dividers or bladders may be included depending on aircraft mission and configuration. In conjunction with the individual bladders, the aircraft also includes gas containers sufficient for one or more refills and a gas recovery pump system.

Base Structure

As shown in FIG. 11, the base structure of the aircraft includes a preferably rectangular frame made up of leading and trailing edge struts 116a, 116b connected to port and starboard outriggers 118a, 118b. The structure also includes envelope expansion arms 120, which extend outward from the base structure on the port and starboard sides in a generally planar direction with respect to the base structure. A pair of moveable longerons—one moveable upper longeron 102 and one moveable lower longeron 104, is located on both the port and starboard sides of the aircraft. The longerons 102 and 104 and envelope expansion arms 120 are connected at two structural connection points 136 located on each side of the aircraft where the outriggers and struts are connected. Longerons 102 and 104 are moveable such that the longerons may be forced in towards core 114 of the aircraft as seen on the port side of the aircraft in FIG. 11. As the longerons move towards a more horizontal position, slack would be created in the envelop if it were not for the envelope expansion arms. Envelop expansion arms 120, are under a constant bias force directed away from core 114 and lengthen/extend outward in the direction of the bias force, which in turn keeps envelope 122 taught. The envelope expansion arms ultimately increase the span of the aircraft as seen in FIG. 5C.

FIG. 11 also illustrates, on the starboard side of the aircraft, the orientation of longerons 102 and 104 and envelope expansion arm 120 when the starboard translation assembly transitions to an expanded configuration. This configuration includes longerons 102 and 104 in a generally vertical orientation, which results in the envelope forcing envelope expansion arm 120 towards core 114 to overcome the predetermined bias force of envelope expansion arm 120.

In an embodiment, as shown in FIG. 12, the base structure may include an additional support member 138. Support member 138 is included to increase the rigidity of the base structure and may be connected to the base structure at any location known to a person having ordinary skill in the art, such that the structure improves rigidity. Multiple support members may be included depending on aircraft configuration. It should be noted that the base structure would include support structure 138 on both the port and starboard sides of the aircraft, but FIG. 12 is limited to the starboard section of the aircraft to reduce clutter.

Also illustrated in FIG. 12 is the open space between core 114 and starboard side outrigger 118b. This open space allows for the storage of the additional systems that will likely be used in operation. The additional systems are preferably mounted to the side of core 114 and may include, but are not limited to batteries, computation devices including the navigation system, control computer, battery charger and control device, navigation, servo motors, internal payload elements and structural components for the envelope.

Referring now to FIG. 13A, an embodiment of structural connection point 136 includes five connection excluding a connection for an additional support member. The connections of moveable longerons 102 and 104 and the connection for envelope expansion arm 120 are pivoting connections, such as ball joints. Strut 116a or 116b and outrigger 118a or 118b connections are preferably fixed connections. The pivoting connections for moveable longerons 102 and 104 and envelope expansion arm 120 aid in the convertibility of the aircraft. The fixed connections of strut 116a or 116b and outrigger 118a or 118b aid in the rigidity of the base structure to improve the aircraft's ability to operate under the typical forces and stresses associated with flight. In an embodiment, as depicted in FIG. 13B, the connection for envelope expansion arm 120 is spring loaded, using for example torsion spring 150, to produce tension on envelope expansion arm 120 in turn transferring the tension onto the envelope; thereby removing slack in the dash configuration.

As shown in FIGS. 14A and 14B, an embodiment includes strut-core connection points 140 that pivotally connect struts 116a, 116b to core 114. Along with pivoting core-support member connection points 137, strut-core connection points 140 allow the base structure of the aircraft to fold to a more compact orientation and improve transportability of the aircraft. FIG. 14 also illustrate how an embodiment includes slideable outrigger-support member connection points 139 instead of the support member connection at the structural connection point. Slideable outrigger-support member connection point 139 slides along outrigger 118 to aid in folding the aircraft.

FIG. 15 provides an embodiment of envelope expansion arm 120. On the smaller sized aircraft, tubes of the appropriate diameter telescope to permit the removal of slack in the flexible envelope to enable high speed flight with minimum envelope flutter. The tension is provided by spring loading features on the structural connection points 136 that connect envelope expansion arms 120, as discussed above.

On larger versions, however, the telescoping tube design is likely be less effective than the use of a unique anisotropic beam design as shown in FIG. 15. The anisotropic beam includes two or more composite rods (preferably a three-rod configuration) with spring steel cross members embedded into the structure. The spring constant (controlled by material and length) will be varied across the length of the beam to provide variable tension on the envelope based on the pressure on the envelope. One or more of the composite rods will interface with the pivot joint assembly at both ends to provide the source of the tension while the other rod(s) will be anchored against the pivot structure. Any twisting or translation of the rods relative to each other is prevented by the spring steel cross members. The design allows different spring constants to be used along the length of the structure by adjusting the stiffness and lengths of the cross members so that pressure on the envelope at the tips and trailing edge can be significantly reduced while pressure at the leading edge can be maintained. This feature provides superior tension control with a lightweight structure and significantly reduces envelope flutter in the dash mode.

As illustrated in FIG. 15, the cross section of envelope expansion arm 120 is preferably triangular in shape with two rods 144 fixed to cross member trusses (made up of cross members 142) and a third rod 146 slidably attached to the cross member trusses. This unique assembly provides envelope expansion arm 120 with varying length capabilities while also allowing for varying structural support depending on the strength of the individual cross member trusses located along the length of envelope expansion arm 120.

This design may also incorporate a telescoping connecting rod to the aft joint for continuity of wing tip shape.

Translation Assembly

Referring to FIG. 16, an embodiment of upper translation assembly 106 includes motor 108, gear assembly 110, and extendable arms 112. In an embodiment, the center of gear assembly 110 is attached to the envelope to aid in maintaining proper envelope positioning. As shown in FIG. 17A, extendable arms 112 are attached to upper moveable longerons 102 and when upper translation assembly 106 is in the extended configuration, upper moveable longerons 102 are in a generally vertical orientation. Contrastingly, FIG. 17B shows upper translation assembly 106 in the retracted configuration, with the moveable longerons 102 pulled inwardly towards motor 108 and into more of a horizontal configuration.

Referring now to FIGS. 18-21, an embodiment includes payload hard points 147 on translation assemblies 106 and 107. Most commonly, the hard point would be located on the lower translation assembly. FIGS. 18 and 19 show lower translation assembly 107 in the extended configuration and FIGS. 20 and 21 show the translation assembly in the retracted configuration. Payload hard points 147 provide an attachment structure for securing payloads to the aircraft. In an embodiment, payload hard point 147 on lower translation assembly 107 is externally located with respect to the envelope. In this embodiment, extendable arms 112 are in communication with lower moveable longerons inside of the envelope while payload hard point 147 extends downwards and out of the envelope allowing certain payloads to be attached outside of the envelope.

As shown in FIG. 22, a certain embodiment of the base structure includes a wing load management system. Note that FIG. 22 provides only the starboard side in an attempt to improve the clarity of the figure. The wing load management system is designed to accommodate payloads having a weight many times greater than the aircraft. Additionally, the system helps maintain the aircraft's center of gravity/weight and balance as well as maintain the underside airfoil shape critical to aerodynamic performance. The system includes one or more strap spars 148 extending in the span direction. Strap spars 148 are preferably flexible and made from Kevlar, or similar strong, flexible lightweight material, and they extend from core 114 to envelope expansion arm 120 on either side of the aircraft to provide wingtip-to-wingtip load distribution. The flexibility of strap spars 148 allow the envelope expansion arms to contract inward towards the core when converting to the LTA configuration. Strap spars 148 may be made from any material providing high tensile strength and flexibility. Strap spars 148 preferably pass underneath one or more support riblets 160, having an arc or airfoil shape, to maintain the airfoil shape and further decrease wingtip curvature under heavy loading. The wing load management system may also include support ribs (not shown) running between leading and trailing edge struts 116a, 116b on either side of core 114 acting as load distributors aiding in maintaining the underside airfoil contour. In a certain embodiment, the support ribs and strap spars 148 may be intertwined as is known by a person having ordinary skill in the art to further increase load distribution.

Variable Chord Length Embodiment

In a certain embodiment, shown in FIG. 23 and generally denoted by reference numeral 200, the present invention is adapted to include at least some portion of the aircraft having a variable chord length. An adjustable chord length—the chord length being the distance between the trailing and leading edges, provides the aircraft with another method of altering the aspect ratio and in turn the performance of the aircraft. Additionally, the adjustment of the chord length provides the aircraft with another method of or an additional aid in transforming between the LTA and HTA configurations.

As shown in FIG. 23, the dash configuration can be achieved by lengthening the chord of the aircraft. The length of the chord can be reduced to create the symmetric LTA configuration shown in FIG. 4. Additionally, this embodiment may include the upper and lower translation assemblies to manipulate the lifting characteristics as is taught by the previous embodiments and allow for nearly an infinite array of aircraft shapes.

The variable chord feature may be achieved in any manner known to a person having ordinary skill in the art. In a certain embodiment, the entire trailing edge strut is adapted to move when adjusting the aircraft's chord length. The adjustment may be accomplished through a drive mechanism such as collet 250 designed to mechanically lengthen core 214 on which the trailing edge strut is secured. Outriggers 218, longerons 202 and 204, and envelope expansion arms 220 may also include similar collets (not shown) to allow these members to adjust in length. In a certain embodiment, longerons 202 and 204, outriggers 218, and envelope expansion arms 220 are structurally designed to telescope and are each subjected to an inherent biasing force trying to extend their respective chord lengths. When the core's chord length extends, taking trailing edge strut 216 with it, longerons 202 and 204, outriggers 218, and envelope expansion arms 220 each extend in length due to their respective inherent biases. Shortening the chord length would be achieved by shortening the core's chord using a drive mechanism with enough force to overcome the biasing forces on longerons 202 and 204, outriggers 218, and envelope expansion arms 220. These components interface with the aircraft joint of FIG. 13 in an analogous manner.

The length adjusting capabilities of the core, longerons, outriggers, and envelope expansion arms may be accomplished by any method(s) or mechanism(s) known to a person having ordinary skill in the art. Additionally, the core and/or the length adjusting mechanism of the core may be in communication with the longerons, outriggers, and envelope expansion arms to help adjust their lengths or each may be controlled and/or move independently from the other.

In another embodiment, the trailing edge of the flexible envelope may be adapted to translate or slide along the outriggers and/or longerons. The core may be directly responsible for adjusting the location of the trailing edge strut, while the outriggers have a non-adjustable chord length. This embodiment would result in some portion of both the outriggers and the longerons extending out from the trailing edge of the flexible envelope in the aft direction when the chord length of the flexible envelope is shortened. This embodiment provides a less complex version to reduce the number of moving parts and the potential problems inherently associated with moving parts.

In a certain embodiment of the present invention having a variable chord length, the aircraft may include a trailing edge strut comprised of two structural members allowing the port and starboard elevons to be angularly oriented with respect to one another. Such an embodiment allows for further manipulation of the aircraft's stability and flight performance. As shown in FIG. 24, core 214 may be non-adjustable or simply remain retracted in chord length while outriggers 218, longerons 202 and 204, and envelope expansion arms 220 increase in chord length. Resultantly, each elevon 224 forms an acute angle with its nearest outrigger 218. Contrastingly, FIG. 25 provides an example of core 214 in an extend chord length position, with outriggers 218 and longerons 202 and 204 in a non-adjustable or a retracted chord length position. Resultantly, each elevon 224 forms an obtuse angle with its nearest outrigger 218. Each configuration offers a unique stability and performance profile.

Variable Span Embodiment

In a certain embodiment, as shown in FIG. 26, leading edge strut 316 and trailing edge strut (not visible) each have an adjustable length such that the span of the aircraft can be altered. The struts preferably include a telescoping design but may include any length adjusting design known to a person having ordinary skill in the art. Moreover, the length may be manually or automatically adjustable. The struts may include intervals at which the struts are capable of locking at predetermined lengths. Such an embodiment may also include rigid support spars having similar length adjusting abilities or may employ flexible strap spars as is shown in FIG. 22. In a certain embodiment, each strut may be adjusted independently, such that the span of one strut may be varied with respect to the span of the other strut to further increase the variability of the aircraft's aerodynamic characteristics.

Flexible Collapsible Embodiment

A certain embodiment is designed to enable the aircraft to reduce in size and fit into a tubular container as shown in FIGS. 27-29. The embodiment includes several features enabling the reduction in size, including adjustable length struts, semi-rigid longerons, and flexible translation assemblies. Adjustable length leading edge strut 316 and trailing edge strut (not shown) enable the span of the aircraft to be reduced. Semi-rigid longerons 302, 304 flex to encircle core 314 and struts 316 (when reduced in length) of the aircraft, while also being resilient enough to return to operational positions when released. Each flexible translation assembly includes translation strap(s) 312 and motor 308 (shown in FIG. 30).

FIG. 30 provides a bottom port side sectional view of the embodiment employing the flexible translation assemblies to improve clarity. The embodiment preferably includes an upper translation assembly (not shown) and a lower translation assembly each having motor 308 in communication with port and starboard side translation straps 312. However, any number of motors and translation straps may be used. Motor 308 is located near, and preferably attached to, core 314. Upper and lower translation assemblies allow the aircraft to alter the camber of the top and bottom of the aircraft independently. The inclusion of port and starboard side translation straps further improves the variability of the aircraft shape by enabling the body of the craft to be divided into four independent quadrants—a top starboard quadrant, a top port quadrant, a bottom starboard quadrant, and a bottom port quadrant. The high variability of the shape of the aircraft results in a high variability of the aircraft's aerodynamic performance. In an embodiment, the upper translation assembly and lower translation assembly each include a motor having two pulleys in communication with one another such that the rotation of one pulley results in the opposite rotation of the other pulley. One pulley is in communication with the starboard translation strap, while the other pulley is in communication with the port side translation strap. Thus, the motor on the upper translation assembly controls the upper translation assembly and the motor on the lower translation assembly controls the lower translation assembly, creating two independent halves.

As shown in FIGS. 30 and 32, each translation strap 312 is fixed is a continuous loop fixed at one of the longerons (either the upper longeron 302 or lower longeron 304 depending on the location of translation strap 312). The continuous loop is in communication with motor 308 and passes around outrigger 318. Motor 308 is adapted to rotate continuous translation strap 312 in either a clockwise or a counterclockwise direction, to cause the translation strap to pull the attached longeron either towards or away from core 314. FIG. 30 provides a sectional view of the bottom port side of the aircraft to highlight the movement of longeron 304 with the rotation of translation strap 312. As motor 308 rotates translation strap 312 in a clockwise direction, longeron 304 is pulled towards core 314 to decrease the camber and alter flight characteristics. In a similar manner, the direction of rotation can be reversed to pull longeron 304 away from core 314. It is contemplated that the translation straps will have the desired effect of manipulating the orientation of the longerons as long as the translation straps are in communication with the longerons and the motor. Additionally, the motor may be located anywhere on the aircraft and the translation strap may pass through a pulley located near the outrigger rather than passing around the outrigger itself. Furthermore, translation strap may be linear rather than a continuous loop with one end attached to the longeron and the other in communication with the motor. Such an embodiment would require an additional mechanism or design to force the longeron away from the core when the tension in the translation strap is decreased. It should be noted that the continuous translation strap fixed at the longeron also provides structural support as a spar strap.

The flexible translation assembly can include any number of translation straps and motors. A certain embodiment may include two straps for each side of the translation assembly. For example, both the upper and lower translation assembly would have two straps on both the port and starboard sides of the translation assembly. If looking only to the lower port side translation assembly, a first translation strap would be fixed on the lower longeron closer to the aft of the longeron and a second strap would be fixed on the lower longeron closer to the fore of the longeron. Each translation strap would be in communication with an independent motor. The aircraft could use the independent translation straps and motors to warp the wing and effectively create lateral roll control, which is often referred to a wing warping. Wing warping is not required to create roll since the port and starboard side longerons can be independently adjusted to create an unequal camber shape and therefore an unequal lifting force on each side of the aircraft. Either way, the flexible translation assembly can negate the need for at least some control surfaces.

The flexible translation assemblies enable the aircraft to be rolled up for easier transportation. As shown in FIGS. 27-29, 31, and 33, the leading and trailing edge struts 316 can telescope down into a reduced length, which significantly reduces the span of the aircraft. Envelope expansion arms 320 can be forced towards the central longitudinal axis of the aircraft by sliding with respect to one another as shown in FIG. 28. Longerons 302 and 304 can then be rotated around core 314 as shown in FIGS. 28-29. The aircraft can then be stored in a tubular container or restrained with cargo straps to greatly improve the ease with which the aircraft can be transported.

As highlighted in FIG. 31, payload hard point 347 is attached to core 314 and is shown extending downward from the underside of the aircraft. FIG. 31 does not include the longerons or the envelope to improve clarity. There may be any number of payload hard points 347 extending in any direction. As shown in FIG. 32, envelope 322 may attach to the edge of payload hard point 347 to allow a payload to attach to payload hard point 347 and remain external from envelope 322.

As shown in FIG. 33, the aircraft may include cargo straps 352 adapted to attach to external cargo pallet 354. Cargo straps 352 are in communication with the structure of the aircraft and pass through the envelope. Cargo pallet 354 is preferably made of lightweight materials in a structurally sound configuration. For example, cargo pallet 354 may include a balsa or honeycomb core covered with a carbon fiber sheet. Additionally, cargo pallet 354 preferably has an aerodynamic profile. Cargo straps 352 may be adjustable in length or include a mechanism for reeling the straps towards core 314. Thus, the entire assembly can tuck into the underside of the aircraft and has an aerodynamic profile similar to that of the flying wing configuration. Such an embodiment will likely include an envelope having sections with varying elasticity. For example, the portion of the envelope spanning the length of the extended leading and trailing edge struts 316 may be generally inelastic such that the location of the passage of cargo straps 352 through the envelope remains consistent throughout the conversions between LTA and HTA configurations. The other portions of the envelope may have greater or lesser elasticity to enable easier transitions between configurations as is known to a person having ordinary skill in the art. Furthermore, the envelope may have a differing elastic modulus along different axes. For example, the envelope may have greater elasticity along the span than along the chord length.

Alternate embodiments of the aircraft may include an envelope having varying elasticity. For example, smaller aircrafts may have a generally elastic envelope, mid-sized aircraft may have sections in the lobe/wing tip area that have material of different elasticity integrated in patches into the skin, and large aircraft may have an accordion-like surface as shown in FIGS. 34-37. FIGS. 35-37 show the transition of the port side lower lobe transitioning from the LTA configuration to an HTA configuration and illustrate the alteration of the accordion-like portion of envelope 322 from a compressed position to an extended position. Along with easing the ability of the craft to transform between the HTA and LTA configurations, the accordion-like envelope may also act as a flow disturbance to maintain laminar flow over the surface of the aircraft.

The envelope may also include sections on the underside that are more rigid than the rest of the envelope to provide a landing surface for the aircraft. In a certain embodiment, these sections are strategically arranged as is known to a person having ordinary skill in the art to provide a landing surface for water landings. The landing surface for water landings is designed such that the amount of surface area in contact with the water is small enough to enable the lifting force created by the aircraft, when in the LTA configuration, to overcome the surface tension of the water.

In a certain embodiment, the leading edge strut and/or the trailing edge strut may each be curved or may each comprise of a two or more structural members creating independent port side and starboard side struts such that the HTA configuration has a wing shape that is angled with respect to the local horizontal. The port side and starboard side struts may be oriented such that they do not lie in the same plane producing an angle with respect to the local horizontal plane. As shown in FIG. 38, port side struts 316c and starboard side struts 316d are attached to core 314 at a positive angle with respect to the local horizontal resulting in a dihedral. The angle may vary in magnitude and direction depending on the required aerodynamic performance. A certain embodiment may include a polyhedral wing shape.

An embodiment of the aircraft may be equipped with flexible solar panels mounted to the upper exterior surface of the envelope to extended on station performance. This allows the aircraft to remain in the LTA configuration and hover while the system batteries are recharged. Energy recovery through the motor, when equipped, is also available while in buoyant mode if turned into an oncoming airstream.

A certain embodiment may include an internally mounted payload capability. This may include cargo, communication, or antenna components. The antenna array provides additional operational capabilities, such as surveillance, communication, or radar interference. In an embodiment, the structure and envelope may be shaped or made of a material less likely to impede the transmission of electromagnetic waves. Antenna elements may also be embedded in the envelope surface for certain frequencies.

In an embodiment, the aircraft may include a detachable tail section. The detachable tail section mates to the base structure of the aircraft through an airtight seal and may include the control surfaces. In addition, the flexible envelope may have an open section at the tail end. The open section of the flexible envelope is intended to be positioned at the tail section of the base structure of the aircraft, such that the attachment of the detachable tail section would encompass envelop and seal the open section of the flexible envelope. When the tail section is removed, the flexible envelope can be opened and maintenance can be performed on the internal workings of the aircraft. The open section of the envelope may be large enough to allow the structure of the aircraft to be removed from the inside of the flexible envelope, which is advantageous for maintenance, and, deconstruction, and transportation. In a certain embodiment, the envelope may include an independent closure mechanism, as is known to a person having ordinary skill in the art, for temporarily sealing the flexible envelope around the internal structures of the aircraft.

In an embodiment, the outriggers may be thrust tubes to provide differential thrust as flight a control method. In another embodiment, the outriggers may be gas tubes for storing additional lighter-than-air gas. The outrigger tubes may also carry liquid gas to supplement the lighter-than-air gasses inside the envelope and facilitate multiple re-inflation cycles with or without recovering gas from the envelope. Additional tanks, other than the outrigger tubes, may be carried to supplement the lighter-than-air gasses.

In an embodiment, the aircraft may include a center of mass (CM) management system. The CM management system can modify the angle of attack and roll by shifting mass in the aircraft, similar to a pilot shifting weight to control a hang-glider.

In an embodiment, the longerons may have a common pivot point, such that the longerons have a generally V-shape orientation with respect to another when viewed from above. The common pivot point could be located towards the front or rear of the aircraft. Additionally, the lower longerons may also have a common pivot point located towards the front or rear of the aircraft. The V-shaped orientation doubles the number of skin support points with a possible reduction of flutter.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An aircraft comprising:
   a convertible design having a lighter-than-air configuration and a heavier-than-air configuration;
   a flexible envelope in communication with a base structure, wherein the flexible envelope has a leading edge and a trailing edge creating a chord line;
   a span extending from a port side wingtip to a starboard side wingtip;
   an upper moveable longeron having an apex with respect to a central lateral plane of the aircraft;
   an upper translation assembly in mechanical communication with the upper moveable longeron and adapted to adjust a distance between the apex of the upper moveable longeron and the central lateral plane of the aircraft;
   a lower moveable longeron having an apex with respect to the central lateral plane of the aircraft;
   a lower translation assembly in mechanical communication with the lower moveable longeron and adapted to adjust a distance between the apex of the lower moveable longeron and the central lateral plane of the aircraft;
   each translation assembly being independently operational such that the aircraft has an adjustable mean camber line.

2. The aircraft of claim 1, wherein the base structure includes a central core, a port side outrigger, and a starboard side outrigger, the core has an adjustable chord length directionally parallel with a longitudinal axis of the aircraft, such that the core is capable of adjusting at least some portion of the chord length of the aircraft.

3. The aircraft of claim 2, wherein the port side outrigger and the starboard side outrigger each have an adjustable chord length, such that at least some portion of the chord length of the aircraft adjusts as each outrigger's chord length adjusts.

4. The aircraft of claim 2, wherein the base structure further includes a leading edge strut extending in a direction perpendicular to and in communication with the central core, a trailing edge strut extending in a direction perpendicular to and in communication with the central core, the port side outrigger extending in a direction parallel to the central core and in communication with the struts, and the starboard side outrigger extending in a direction parallel to the central core and in communication with the struts.

5. The aircraft of claim 4, wherein the envelope expansion arm is an anisotropic beam including two or more composite rods with cross members having a predetermined spring constant embedded into the structure, one of the composite rods is pivotally attached to the aircraft and one or more of the composite rods is anchored against the pivot structure to provide a source of the tension.

6. The aircraft of claim 4, further including a port side envelope expansion arm and a starboard side envelope expansion arm, wherein each envelope expansion arm has a generally arc shape and an adjustable chord length in generally the same direction as the central longitudinal axis of the aircraft.

7. The aircraft of claim 1, further comprising:
   the upper moveable longeron being in communication with the base structure and the flexible envelope, and the lower moveable longerons being in communication with the base structure and the flexible envelope;
   each translation assembly having an extended configuration where its respective moveable longeron is in a high camber orientation and a retracted configuration where its respective moveable longeron is in a low camber orientation, in transitioning to the retracted configuration, each translation assembly moves its respective moveable longeron inward towards a central lateral plane of the aircraft to decrease aircraft thickness, and in transitioning to the extended configuration, the moveable longeron moves outward away from the central lateral plane of the aircraft to increase the aircraft thickness;

a length-adjusting envelope expansion arm in communication with the flexible envelope and a biasing component imparting a biasing force on the envelope expansion arm in a direction away from the central lateral plane of the aircraft; and the length-adjusting envelope expansion arm having a retracted position and an expanded position, wherein the length-adjusting envelope expansion arm is capable of transitioning between the retracted and expanded positions to alter the shape of the flexible envelope.

8. The aircraft of claim 1, wherein the upper and lower moveable longerons each include a port side longeron and a starboard side longeron and each longeron has a first end and a second end with a length extending therebetween along its respective longitudinal axis and each longeron has a non-linear shape along its length.

9. The aircraft of claim 8, wherein the moveable longerons are in a generally vertical orientation, with respect to a span of the aircraft, when in a high camber position and the moveable longerons are in an acute angle orientation, with respect to the span of the aircraft, when in a low camber position.

10. The aircraft of claim 9, further comprising a wing load management system including a plurality of rigid supporting ribs extending between the leading edge strut and the trailing edge strut and a plurality of flexible strap spars extending between the central core and the envelope expansion arm.

11. The aircraft of claim 10, wherein the plurality of rigid supporting ribs have an adjustable chord length.

12. The aircraft of claim 9, wherein the leading edge strut is out of plane with the chord line.

13. The aircraft of claim 9, wherein the leading edge strut and trailing edge strut are have adjustable lengths.

14. The aircraft of claim 1, further comprising a gas storage and retrieval system adapted to house, distribute, and retrieve lighter-than-air gas.

15. The aircraft of claim 1, further comprising a propulsion system.

16. The aircraft of claim 1, further comprising:
the upper moveable longeron in communication with the base structure and the flexible envelope and the lower moveable longeron in communication with the base structure and the flexible envelope; and
each translation assembly including a translation motor fixed to the base structure of the aircraft and a translation strap in communication with the translation motor, the translation strap is a continuous loop fixed at one of the longerons and passes near an outrigger on the same side of the aircraft, when operated the motor causes the translation strap to rotate, which in turn pulls the longeron towards or away from a central lateral plane of the aircraft.

17. The aircraft of claim 1, wherein the flexible envelope includes at least some portion having an accordion-like structure.

18. The aircraft of claim 1, further comprising:
the upper longeron having a first end secured to the base structure proximate the leading edge of the of the flexible envelope and a second end secured to the base structure proximate a trailing edge of the flexible envelope with a length extending along its longitudinal axis;
the length of the upper longeron being greater than the length of the chord line at least when the aircraft is in the lighter-than-air configuration;
the lower longeron having a first end secured to the base structure proximate the leading edge of the of the flexible envelope and a second end secured to the base structure proximate a trailing edge of the flexible envelope with a length along its longitudinal axis; and
the length of the lower longeron being greater than the length of the chord line at least when the aircraft is in the lighter-than-air configuration.

19. An aircraft comprising:
a convertible design having a lighter-than-air configuration and a heavier-than-air configuration;
a flexible envelope in communication with a base structure, the flexible envelope adapted to be sealed;
an upper longeron at least partially enclosed by the flexible envelope, the upper longeron having a first end, a second end, and an apex therebetween, wherein the apex is a fixed point along the upper longeron that is at a greater distance from a lateral plane of the aircraft than any other point along the upper longeron;
an upper translation assembly in communication with the upper longeron, wherein the upper translation assembly is adapted to alter the distance between the apex of the upper longeron and the lateral plane of the aircraft;
a lower longeron at least partially enclosed by the flexible envelope, the lower longeron having a first end, a second end, and an apex therebetween, wherein the apex is a fixed point along the lower longeron that is at a greater distance from the lateral plane of the aircraft than any other point along the lower longeron; and
a lower translation assembly in communication with the lower longeron, wherein the lower translation assembly is adapted to alter the distance between the apex of the lower longeron and the lateral plane of the aircraft.

20. An aircraft comprising:
a convertible design having a lighter-than-air configuration and a heavier-than-air configuration;
a flexible envelope in communication with a base structure, the flexible envelope adapted to be sealed;
a lower longeron at least partially enclosed by the flexible envelope, the lower longeron having a first end, a second end, and an apex therebetween, wherein the apex is a single point along the lower longeron that is at a maximum distance from a lateral plane of the aircraft;
a lower translation assembly in communication with the lower longeron, wherein the lower translation assembly is adapted to alter the distance between the apex of the lower longeron and the lateral plane of the aircraft;
whereby the lower translation assembly is capable of altering a mean camber of the aircraft by adjusting the distance between the apex of the lower longeron and the lateral plane of the aircraft without altering an upper curvature of the aircraft.

* * * * *